(12) United States Patent
de Dinechin et al.

(10) Patent No.: US 7,996,833 B2
(45) Date of Patent: Aug. 9, 2011

(54) METHOD AND SYSTEM FOR REPLACING INSTRUCTIONS AND INSTRUCTION BLOCKS IN COMPUTER CODE

(75) Inventors: Christophe de Dinechin, Roquebrune sur Argens (FR); Todd Kjos, Los Altos, CA (US); Jonathan Ross, Woodinville, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1988 days.

(21) Appl. No.: 10/909,966

(22) Filed: Jul. 31, 2004

(65) Prior Publication Data

US 2006/0026577 A1    Feb. 2, 2006

(51) Int. Cl.
    *G06F 9/455*    (2006.01)
(52) U.S. Cl. .......................................................... 718/1

(58) Field of Classification Search ....... 718/1; 717/174
    See application file for complete search history.

(56) References Cited

U.S. PATENT DOCUMENTS 5,586,323 A * 12/1996 Koizumi et al. .............. 717/174
7,516,453 B1 * 4/2009 Bugnion ............................ 718/1

* cited by examiner

*Primary Examiner* — Meng A An
*Assistant Examiner* — Eric C Wai

(57) ABSTRACT

Various embodiments of the present invention are directed to efficient methods by which virtual-machine monitors can introduce instructions into guest-operating-system code. In one embodiment of the present invention, the virtual-machine monitor builds instructions dynamically, at insertion time, using specified values for fields within the instruction. In one embodiment of the present invention, the instructions and instruction field values are stored in an instruction-block-representing data structure.

7 Claims, 18 Drawing Sheets

Application Register Set
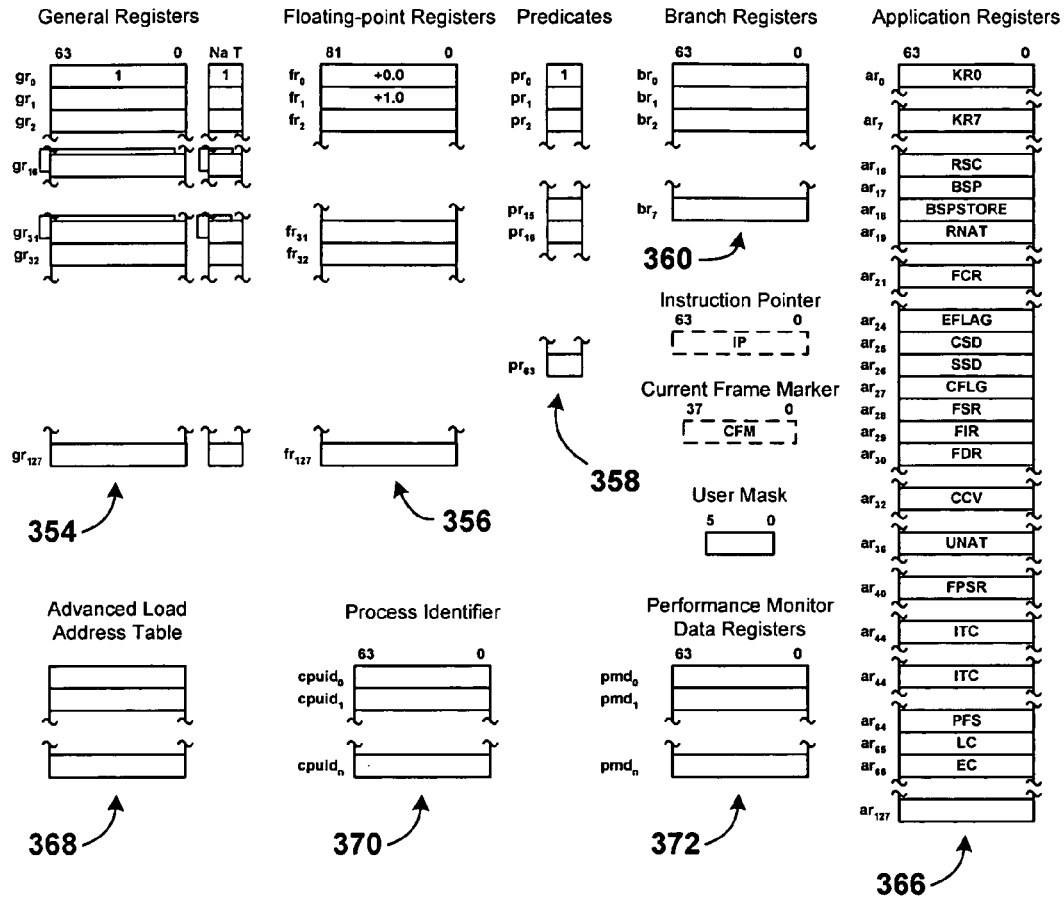
System Register Set
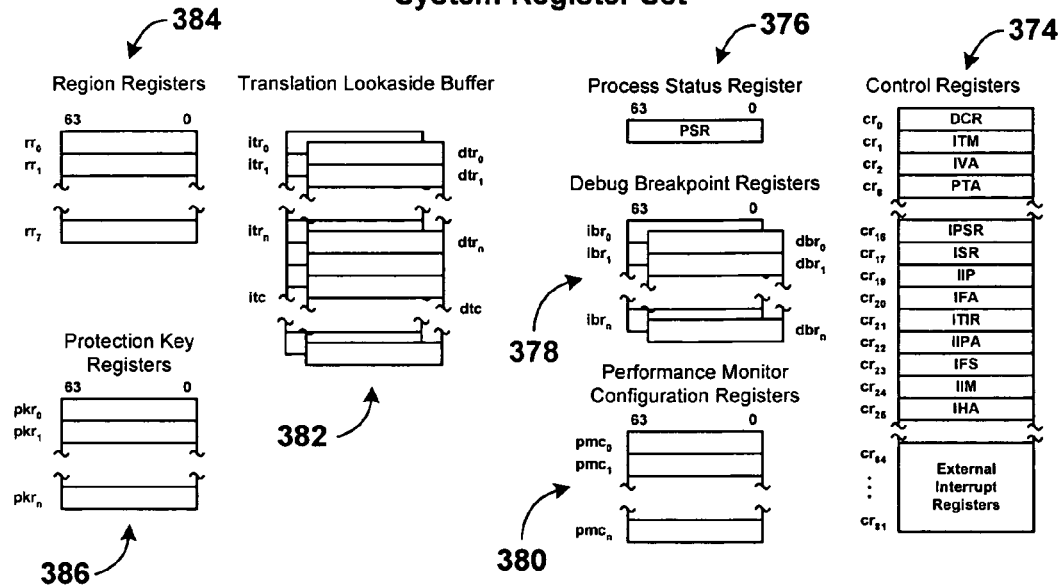
Figure 3B

| TLB.ar | TLB.pl | Privilege Level 3 | Privilege Level 2 | Privilege Level 1 | Privilege Level 0 | DESCRIPTION |
|---|---|---|---|---|---|---|
| 0 | 3 | R | R | R | R | READ ONLY — 710 |
| 0 | 2 |   | R | R | R |  |
| 0 | 1 |   |   | R | R |  |
| 0 | 0 |   |   |   | R |  |
| 1 | 3 | RX | RX | RX | RX | READ, EXECUTE |
| 1 | 2 |   | RX | RX | RX |  |
| 1 | 1 |   |   | RX | RX |  |
| 1 | 0 |   |   |   | RX |  |
| 2 | 3 | RW | RW | RW | RW | READ, WRITE |
| 2 | 2 |   | RW | RW | RW |  |
| 2 | 1 |   |   | RW | RW |  |
| 2 | 0 |   |   |   | RW |  |
| 3 | 3 | RWX | RWX | RWX | RWX | READ, WRITE, EXECUTE |
| 3 | 2 |   | RWX | RWX | RWX |  |
| 3 | 1 |   |   | RWX | RWX |  |
| 3 | 0 |   |   |   | RWX |  |
| 4 | 3 | R | RW | RW | RW | READ ONLY / READ, WRITE |
| 4 | 2 |   | R | RW | RW |  |
| 4 | 1 |   |   | R | RW |  |
| 4 | 0 |   |   |   | RW |  |
| 5 | 3 | RX | RX | RX | RWX | READ, EXECUTE / READ, WRITE, EXEC |
| 5 | 2 |   | RX | RX | RWX |  |
| 5 | 1 |   |   | RX | RWX |  |
| 5 | 0 |   |   |   | RWX |  |
| 6 | 3 | RWX | RW | RW | RW | READ, WRITE, EXECUTE / READ, WRITE |
| 6 | 2 |   | RWX | RW | RW |  |
| 6 | 1 |   |   | RWX | RW |  |
| 6 | 0 |   |   |   | RW |  |
| 7 | 3 | X | X | X | RX | EXEC, PROMOTE / READ, EXECUTE |
| 7 | 2 | XP2 | X | X | RX |  |
| 7 | 1 | XP1 | XP1 | X | RX |  |
| 7 | 0 | XP0 | XP0 | XP0 | RX |  |

Figure 7

METHOD AND SYSTEM FOR REPLACING INSTRUCTIONS AND INSTRUCTION BLOCKS IN COMPUTER CODE

TECHNICAL FIELD

The present invention is related to computer architecture, operating systems, and virtual-machine monitors, and, in particular, to methods, and virtual-machine monitors incorporating the methods, for replacing particular instructions and sequences of instructions in executable code.

BACKGROUND OF THE INVENTION

During the past 50 years, computer hardware, architecture, and operating systems that run on computers have evolved to provide ever-increasing storage space, execution speeds, and features that facilitate computer intercommunication, security, application-program development, and ever-expanding range of compatibilities and interfaces to other electronic devices, information-display devices, and information-storage devices. In the 1970's, enormous strides were made in increasing the capabilities and functionalities of operating systems, including the development and commercial deployment of virtual-memory techniques, and other virtualization techniques, that provide to application programs the illusion of extremely large address spaces and other virtual resources. Virtual memory mechanisms and methods provide 32-bit or 64-bit memory-address spaces to each of many user applications concurrently running on computer system with far less physical memory.

Virtual machine monitors provide a powerful new level of abstraction and virtualization. A virtual machine monitor comprises a set of routines that run directly on top of a computer machine interface, and that, in turn, provides a virtual machine interface to higher-level programs, such as operating systems. An operating system, referred to as a "guest operating system," runs above, and interfaces to, a well-designed and well-constructed virtual-machine interface just as the operating system would run above, and interface to, a bare machine.

A virtual-machine monitor uses many different techniques for providing a virtual-machine interface, essentially the illusion of a machine interface to higher-level programs. A virtual-machine monitor may pre-process operating system code to replace privileged instructions and certain other instructions with patches that emulate these instructions. The virtual-machine monitor generally arranges to intercept and emulate the instructions and events which behave differently under virtualization, so that the virtual-machine monitor can provide virtual-machine behavior consistent with the virtual machine definition to higher-level software programs, such as guest operating systems and programs that run in program-execution environments provided by guest operating systems. The virtual-machine monitor controls physical machine resources in order to fairly allocate physical machine resources among concurrently executing operating systems and preserve certain physical machine resources, or portions of certain physical machine resources, for exclusive use by the virtual-machine monitor.

A virtual-machine monitor patches guest-operating-system executable code by introducing single instructions and blocks of instructions into the guest-operating-system code. Unfortunately, guest-operating-system code may be frequently re-compiled and/or re-linked, affecting the field values within instructions needed for correct execution. Designers, implementers, manufacturers, and users of virtual-machine monitors and virtual-monitor-containing computer systems recognize the need for an efficient and robust method by which virtual-machine monitors can introduce instructions into guest-operating-system code without using enormous tables listing all possible forms of the instructions.

SUMMARY OF THE INVENTION

Various embodiments of the present invention are directed to efficient methods by which virtual-machine monitors can introduce instructions into guest-operating-system code. In one embodiment of the present invention, the virtual-machine monitor builds instructions dynamically, at insertion time, using specified values for fields within the instruction. In one embodiment of the present invention, the instructions and instruction field values are stored in an instruction-block-representing data structure.

BRIEF DESCRIPTION OF THE DRAWINGS

FIGS. 3A-B show the registers within an Itanium processor.

FIG. 7 shows the access rights encoding used in a TLB entry.

DETAILED DESCRIPTION OF THE INVENTION

The present invention is related to virtual-machine monitors and processing of guest-operating-system data and code in order to replace particular instructions and blocks of instructions that need to be modified or patched by the virtual-machine monitor. A described embodiment makes use of Intel Itanium® architecture features. Additional information concerning virtual memory, virtual-machine monitors, and the Itanium architecture are first provided, in a following subsection, followed by a detailed discussion of several embodiments of the present invention, in a subsequent subsection.

Figure 1:
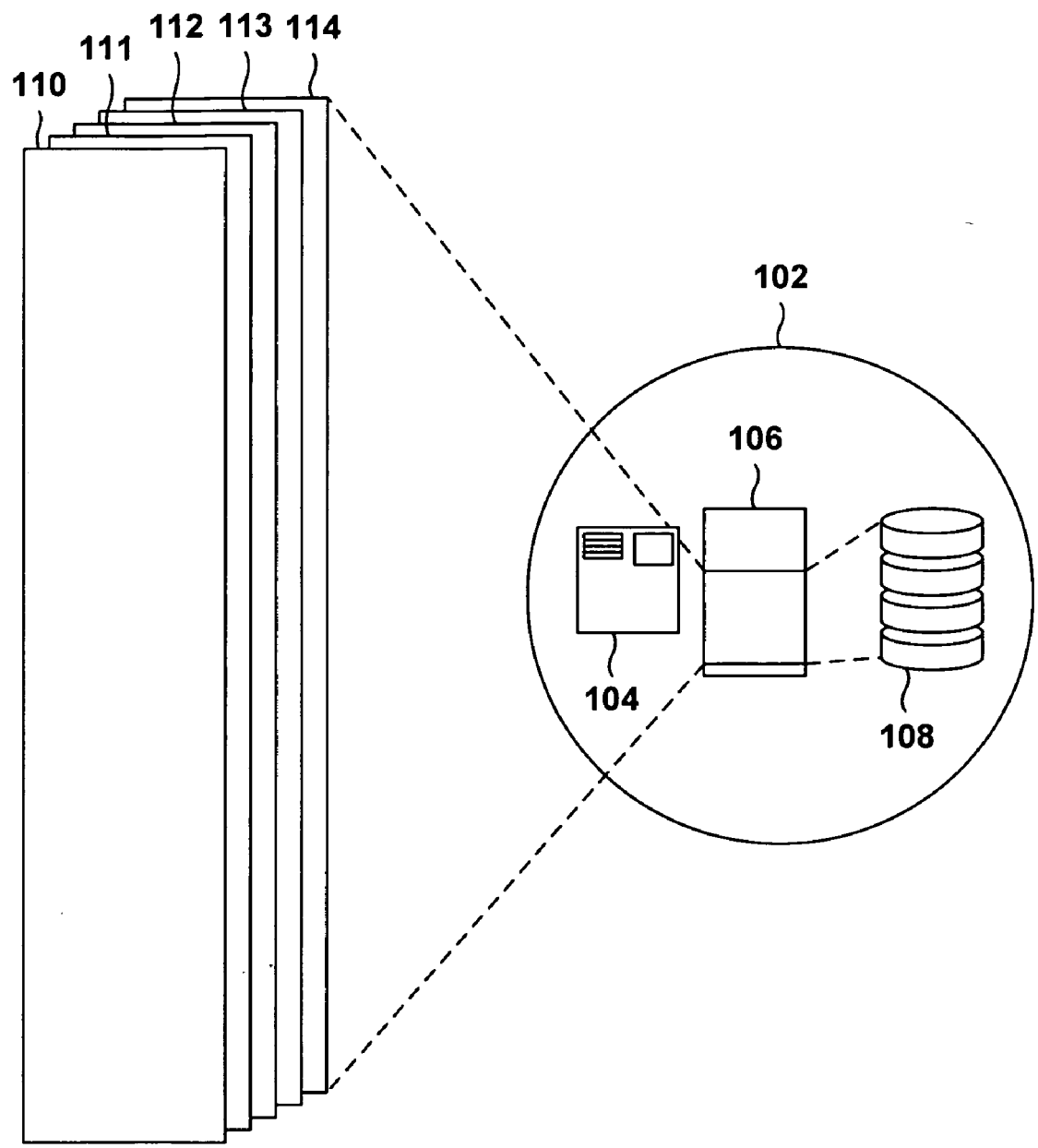
FIG. 1 illustrates virtual memory provided by a combined operating-system/hardware system.

Additional Information About Virtual Memory, Virtual Monitors, and the Intel®Itanium Computer Architecture Virtual Memory FIG. 1 illustrates virtual memory provided by a combined operating-system/hardware system. In FIG. 1, the operating system is abstractly represented as a circle 102 enclosing hardware components including a processor 104, physical memory 106, and mass-storage devices 108. FIG. 1 is intended to abstractly represent certain features of the hardware system, or machine, rather than to accurately represent a machine or enumerate the components of a machine. In general, the operating system provides, to each process executing within the execution environment provided by the operating system, a large virtual-memory address space, represented in FIG. 1 by vertical columns external to the operating system, such as vertical column 110. The virtual-memory address space defines a sequence of addressable memory bytes with addresses ranging from 0 to $2^{64}-1$ for a combined operating-system/hardware system supporting 64-bit addresses. The Itanium virtual address space is up to 85 bits wide, comprising a 61-bit offset and a 24-bit region selector, with a 64-bit address space accessible at any point in time. Depending on the machine and operating system, certain portions of the virtual-memory address space may be inaccessible to a process, and various mechanisms may be used to extend the size of the virtual-memory address space beyond the maximum size addressable by the machine-supported addressing unit. An operating system generally provides a separate virtual-memory address space to each process concurrently executing on top of the operating system, so that, as shown in FIG. 1, the operating system may simultaneously support a number of distinct and separate virtual-memory address spaces 110-114.

A virtual-memory address space is, in many respects, an illusion created and maintained by the operating system. A process or thread executing on the processor 104 can generally access only a portion of physical memory 106. Physical memory may constitute various levels of caching and discrete memory components distributed between the processor and separate memory integrated circuits. The physical memory addressable by an executing process is often smaller than the virtual-memory address space provided to a process by the operating system, and is almost always smaller than the aggregate size of the virtual-memory address spaces simultaneously provided by the operating system to concurrently executing processes. The operating system creates and maintains the illusion of relatively vast virtual-memory address spaces by storing the data, addressed via a virtual-memory address space, on mass-storage devices 108 and rapidly swapping portions of the data, referred to as pages, into and out from physical memory 106 as demanded by virtual-memory accesses made by executing processes. In general, the patterns of access to virtual memory by executing programs are highly localized, so that, at any given instant in time, a program may be reading to, and writing from, only a relatively small number of virtual-memory pages. Thus, only a comparatively small fraction of virtual-memory accesses require swapping of a page from mass-storage devices 108 to physical memory 106.

Virtual Monitors

Figure 2:
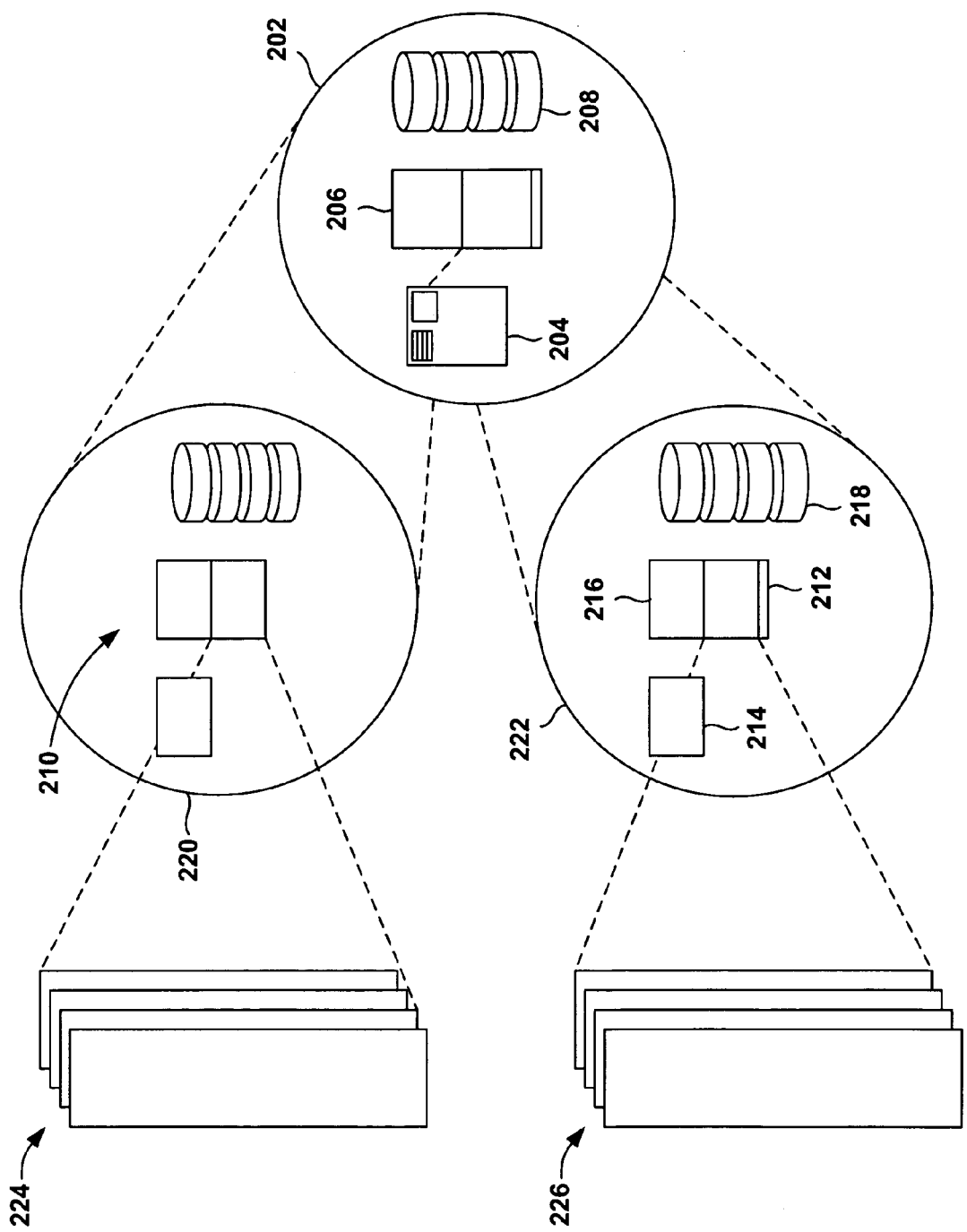
FIG. 2 illustrates a monitor-based approach to supporting multiple, concurrently executing operating systems.

A virtual-machine monitor is a set of routines that lie above the physical machine interface, and below all other software routines and programs that execute on a computer system. A virtual-machine monitor, also referred to as a "hypervisor" or simply as a "monitor," provides a virtual-machine interface to each operating system concurrently executing on the computer system. The virtual-machine interface includes those machine features and characteristics expected of a machine by operating systems and other programs that execute on machines. For example, a virtual-machine interface includes a virtualized virtual-memory-system interface. FIG. 2 illustrates a virtual-monitor-based approach to supporting multiple, concurrently executing operating systems. In FIG. 2, a first circle 202 encloses the physical processor 204, physical memory 206, and mass-storage devices 208 of a computer system. The first enclosing circle 202 represents a virtual-machine monitor, a software layer underlying the traditional operating-system software layer of the computer system. The virtual-machine monitor provides virtual-machine interfaces 210 and 212. The virtual machine can be considered to include a virtual processor, virtual physical memory, and virtual mass-storage devices, e.g., 214, 216, 218, respectively. An operating system software layer can be considered to encapsulate each virtual machine, such as operating systems 220 and 222 represented by circles in FIG. 2. In turn, the operating systems each provide a number of guest-virtual-memory address spaces 224 and 226 to processes concurrently executing within the execution environments provided by the operating systems. The virtual-machine monitor may provide multiple virtual processors to guest operating systems, and may provide a different number of virtual processors than the number of physical processors contained in the computer system.

Intel Itanium® Architecture

Figure 3A:
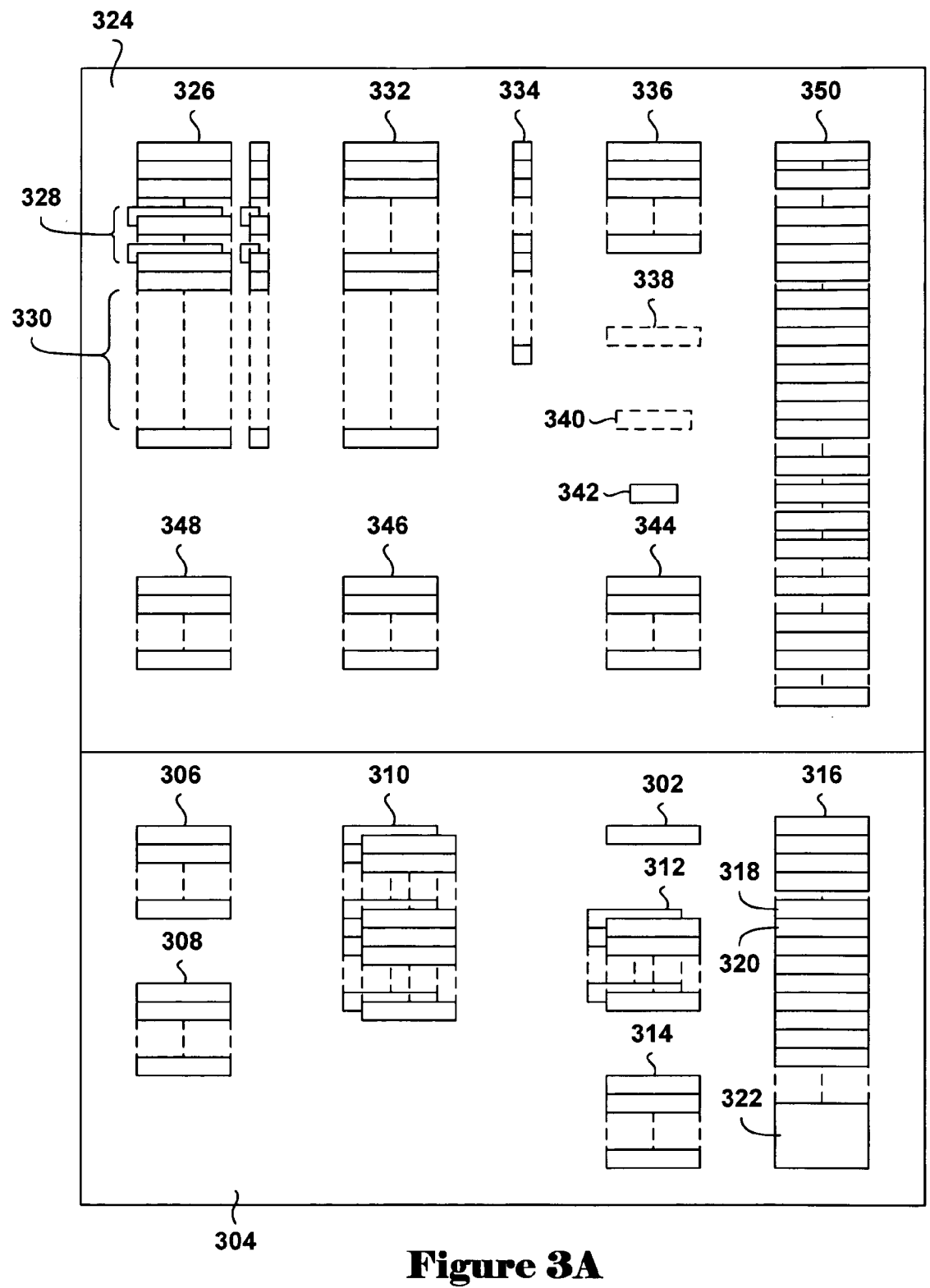
Figure 4:
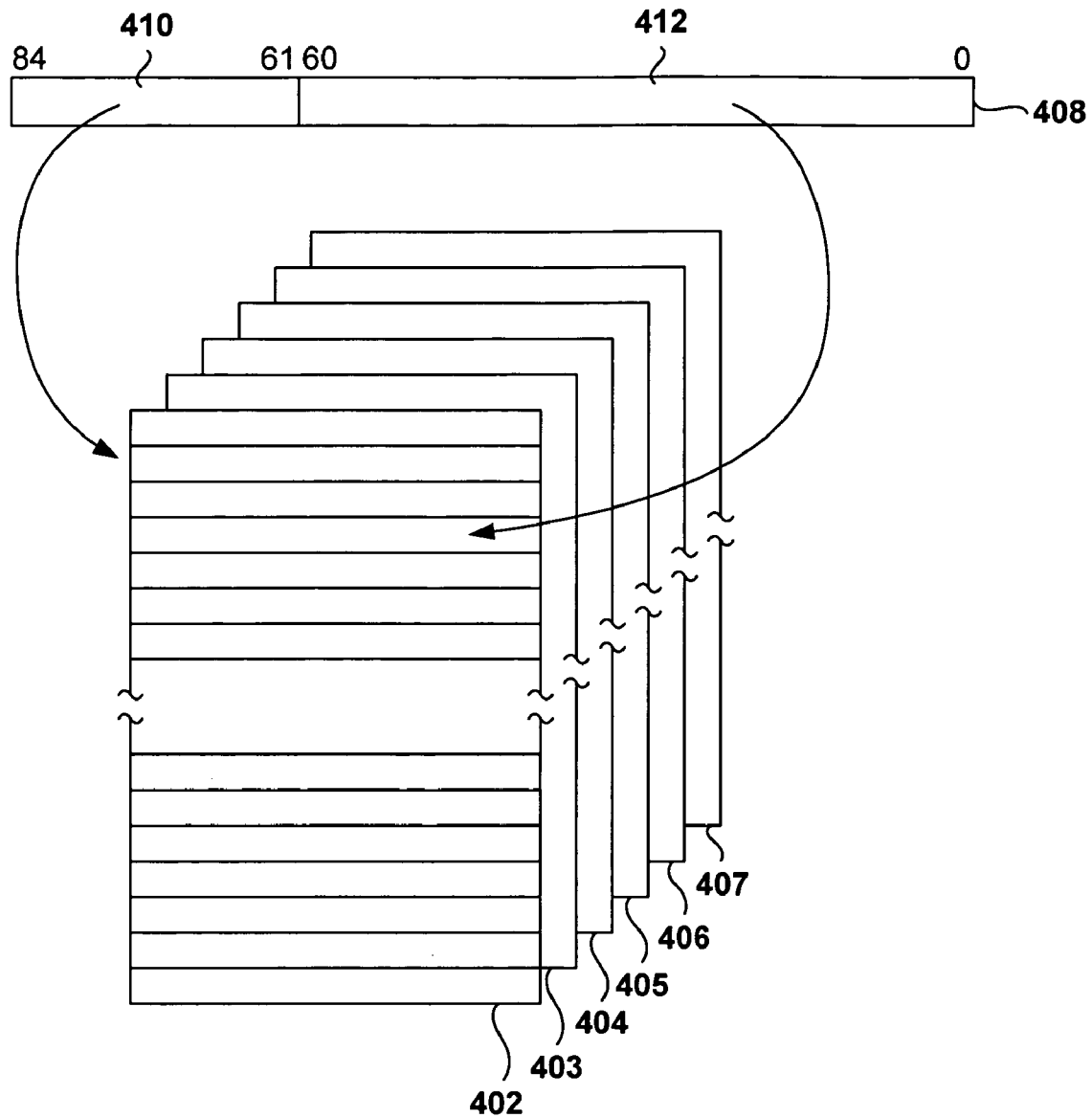
FIG. 4 illustrates the virtual address space provided by one modern computer architecture.

Processors, such as Intel Itanium® processors, built to comply with the Intel® Itanium computer architecture represent one example of a modern computer hardware platform suitable for supporting a monitor-based virtual machine that in turn supports multiple guest-operating-systems, in part by providing a virtual physical memory and virtual-address translation facilities to each guest operating system. FIGS. 3A-B show the registers within an Itanium processor. FIG. 3A is a block diagram showing the registers within the processor. The registers hold values that define the execution state of the processor, and, when saved to memory, capture the machine state of an executing process prior to stopping execution of the process. Restoring certain registers saved in memory allows for resumption of execution of an interrupted process. The register set shown in FIGS. 3A-B is quite complex, and only certain of the registers are described, below.

The process status register ("PSR") 302 is a 64-bit register that contains control information for the currently executing process. The PSR comprises many bit fields, including a 2-bit field that contains the current privilege level ("CPL") at which the currently executing process is executing. There are four privilege levels: 0, 1, 2, and 3. The most privileged privilege level is privilege level 0. The least privileged privilege level is privilege level 3. Only processes executing at privilege level 0 are allowed to access and manipulate certain machine resources, including the subset of registers, known as the "system-register set," shown in FIG. 3A within the lower rectangle 304. One control register, the interruption processor status register ("IPSR") 318, stores the value of the PSR for the most recently interrupted process. The interruption status register ("ISR") 320 contains a number of fields that indicate the nature of the interruption that most recently occurred to an interruption handler when the PSR.ic field flips from "1," at the time of a fault or interrupt, to "0" as the interruption handler is invoked. Other control registers store information related to other events, such as virtual memory address translation information related to a virtual address translation fault, pointers to the last successfully executed instruction bundle, and other such information. Sets of external interrupt control registers 322 are used, in part, to set interrupt vectors. The IHA register stores an indication of a virtual hash page table location at which the virtual-address translation corresponding to a faulting virtual address should be found.

The registers shown in FIG. 3A in the upper rectangular region 324 are known as the "application-register set." These registers include a set of general registers 326, sixteen of which 328 are banked in order to provide immediate registers for interruption handling code. At least 96 general registers 330 form a general-register stack, portions of which may be automatically stored and retrieved from backing memory to facilitate linkages among calling and called software routines. The application-register set also includes floating point registers 332, predicate registers 334, branch registers 336, an instruction pointer 338, a current frame marker 340, a user mask 342, performance monitor data registers 344, processor identifiers 346, an advanced load address table 348, and a set of specific application registers 350.

FIG. 3B shows another view the registers provided by the Itanium architecture, including the 128 64-bit general purpose registers 354, a set of 128 82-bit floating point registers 356, a set of 64 predicate registers 358, a set of 64 branch registers 360, a variety of special purpose registers including application registers ("AR") $AR_0$ through $AR_{127}$ 366, an advance load address table 368, process-identifier registers 370, performance monitor data registers 372, the set of control registers ("CR") 374, ranging from $CR_0$ to $CR_{81}$, the PSR register 376, break point registers 378, performance monitor configuration registers 380, a translation lookaside buffer 382, region registers 384, and protection key registers 386. Note that particular AR registers and CR registers have acronyms that reflect their use. For example, AR register $AR_{17}$ 388, the backing-store-pointer register, is associated with the acronym BSP, and this register may be alternatively specified as the BSP register or the AR[BSP] register. In many of the registers, single bits or groups of bits comprise fields containing values with special meanings. For example, the two least significant bits within register AR[RSC] 390 together compose a mode field which controls how aggressively registers are saved and restored by the processor. These two bits can be notationally specified as "AR[RSC].mode."

The memory and virtual-address-translation architecture of the Itanium computer architecture is described below, with references to FIGS. 4-7. The virtual address space defined within the Intel Itanium computer architecture includes $2^{24}$ regions, such as regions 402-407 shown in FIG. 4, each containing $2^{61}$ bytes that are contiguously addressed by successive virtual memory addresses. Thus, the virtual memory address space can be considered to span a total address space of $2^{85}$ bytes of memory. An 85-bit virtual memory address 408 can then be considered to comprise a 24-bit region field 410 and a 61-bit address field 412.

Figure 5:
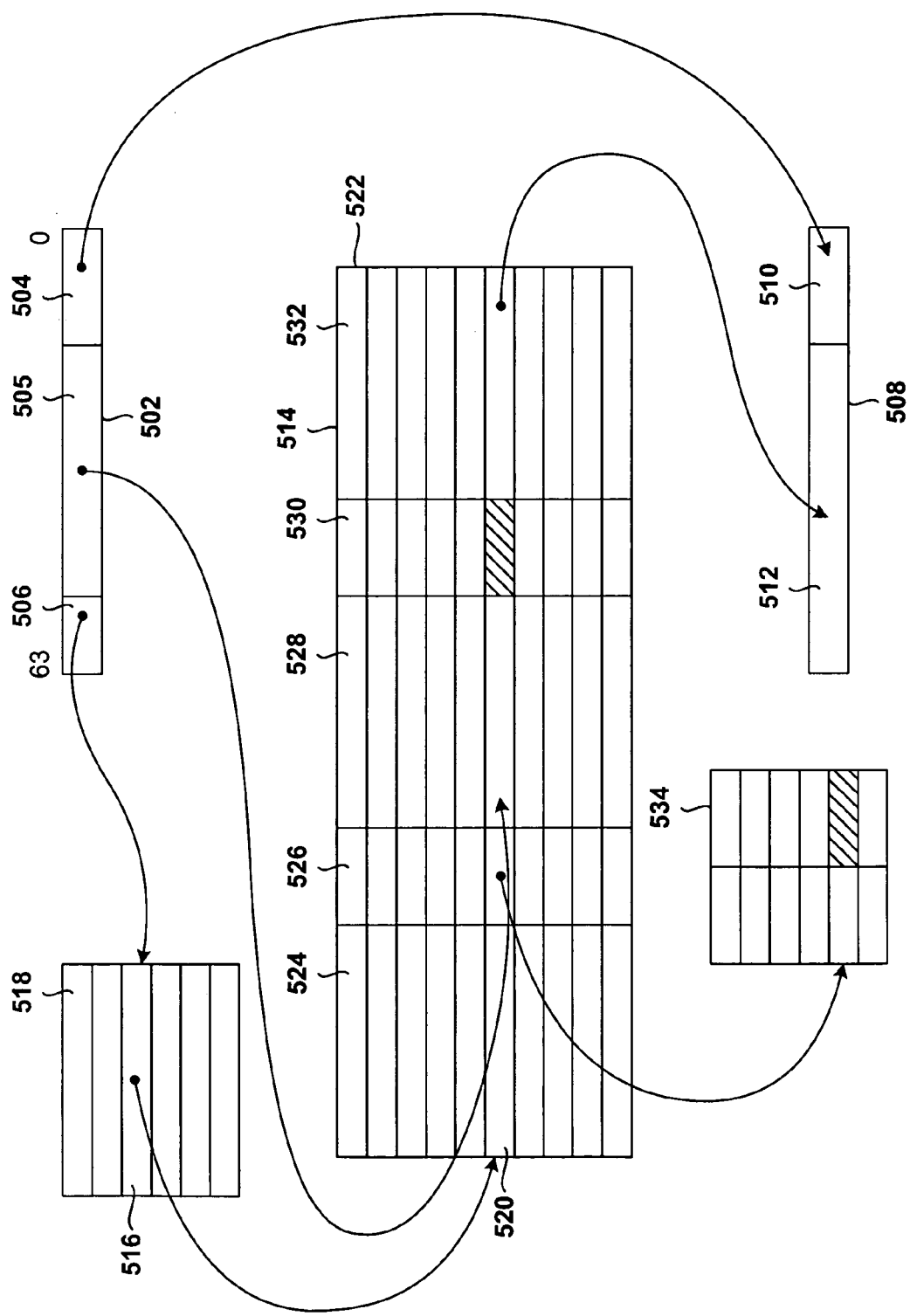
FIG. 5 illustrates translation of a virtual memory address into a physical memory address via information stored within region registers, protection key registers, and a translation look-aside buffer.

In general, however, virtual memory addresses are encoded as 64-bit quantities. FIG. 5 illustrates translation of a 64-bit virtual memory address into a physical memory address via information stored within region registers, protection key registers, and a translation look-aside register buffer ("TLB"). In the Intel® Itanium architecture, virtual addresses are 64-bit computer words, represented in FIG. 5 by a 64-bit quantity 502 divided into three fields 504-506. The first two fields 504 and 505 have sizes that depend on the size of a memory page, which can be adjusted within a range of memory page sizes. The first field 504 is referred to as the "offset." The offset is an integer designating a byte within a memory page. If, for example, a memory page contains 4096 bytes, then the offset needs to contain 12 bits to represent the values 0-4095. The second field 505 contains a virtual page address. The virtual page address designates a memory page within a virtual address space that is mapped to physical memory, and further backed up by memory pages stored on mass storage devices, such as disks. The third field 506 is a three-bit field that designates a region register containing the identifier of a region of virtual memory in which the virtual memory page specified by the virtual page address 505 is contained.

One possible virtual-address-translation implementation consistent with the Itanium architecture is next discussed. Translation of the virtual memory address 502 to a physical memory address 508 that includes the same offset 510 as the offset 504 in the virtual memory address, as well as a physical page number 512 that references a page in the physical memory components of the computer system, is carried out by the processor, at times in combination with operating-system-provided services. If a translation from a virtual memory address to a physical memory address is contained within the TLB 514, then the virtual-memory-address-to-physical-memory-address translation can be entirely carried out by the processor without operating system intervention. The processor employs the region register selector field 506 to select a register 516 within a set of region registers 518. The selected region register 516 contains a 24-bit region identifier. The processor uses the region identifier contained in the selected region register and the virtual page address 505 together in a hardware function to select a TLB entry 520 containing a region identifier and virtual memory address that match the region identifier contained in the selected region register 516 and the virtual page address 505. Each TLB entry, such as TLB entry 522, contains fields that include a region identifier 524, a protection key associated with the memory page described by the TLB entry 526, a virtual page address 528, privilege and access mode fields that together compose an access rights field 530, and a physical memory page address 532.

If a valid entry in the TLB, with present bit=1, can be found that contains the region identifier contained within the region register specified by the region register selector field of the virtual memory address, and that entry contains the virtual-page address specified within the virtual memory address, then the processor determines whether the virtual-memory page described by the virtual-memory address can be accessed by the currently executing process. The currently executing process may access the memory page if the access rights within the TLB entry allow the memory page to be accessed by the currently executing process and if the protection key within the TLB entry can be found within the protection key registers 534 in association with an access mode that allows the currently executing process access to the memory page. Protection-key matching is required only when the PSR.pk field of the PSR register is set. The access rights contained within a TLB entry include a 3-bit access mode field that indicates one, or a combination of, read, write, and execute privileges, and a 2-bit privilege level field that specifies the privilege level needed by an accessing process. Each protection key register contains a protection key of up to 24 bits in length associated with an access mode field specifying allowed read, write, and execute access modes and a valid bit indicating whether or not the protection key register is currently valid. Thus, in order to access a memory page described by a TLB entry, the accessing process needs to access the page in a manner compatible with the access mode associated with a valid protection key within the protection key registers and associated with the memory page in the TLB entry, and needs to be executing at a privilege level compatible with the privilege level associated with the memory page within the TLB entry.

If an entry is not found within the TLB with a region identifier and a virtual page address equal to the virtual page address within the virtual memory address and a region identifier selected by the region register selection field of a virtual memory address, then a TLB miss occurs and hardware may attempt to locate the correct TLB entry from an architected mapping control table, called the virtual hash page table ("VHPT"), located in protected memory, using a hardware-provided VHPT walker. If the hardware is unable to locate the correct TLB entry from the VHPT, a TLB-miss fault occurs and a kernel or operating system is invoked in order to find the specified memory page within physical memory or, if necessary, load the specified memory page from an external device into physical memory, and then insert the proper translation as an entry into the VHPT and TLB. If, upon attempting to translate a virtual memory address to a physical memory address, the kernel or operating system does not find a valid protection key within the protection key registers 534, if the attempted access by the currently executing process is not compatible with the access mode in the TLB entry or the read/write/execute bits within the protection key in the protection key register, or if the privilege level at which the currently executing process executes is less privileged than the privilege level needed by the TLB entry, then a fault occurs that is handled by a processor dispatch of execution to operating system code.

Figure 6:
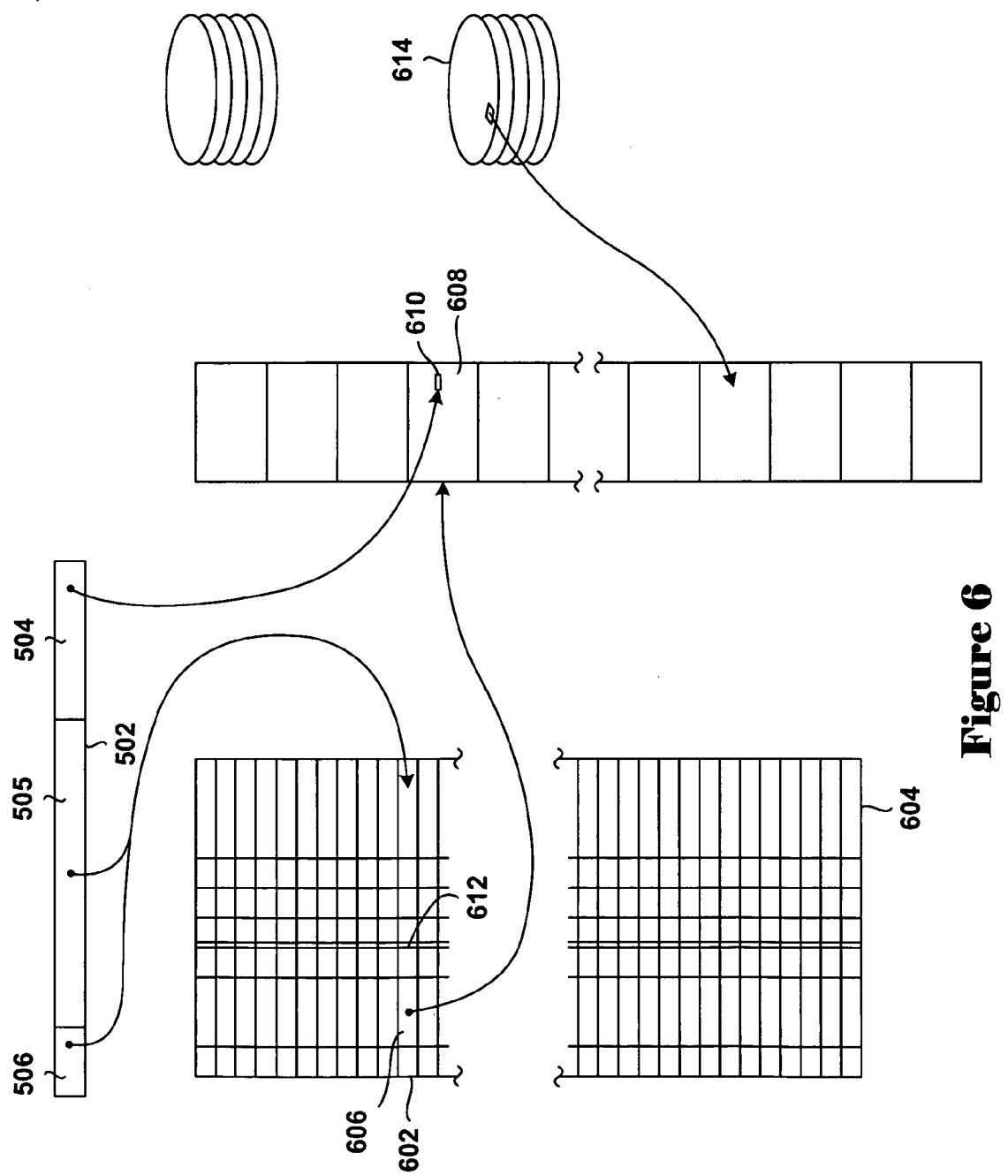
FIG. 6 shows the data structures employed by an operating system to find a memory page in physical memory corresponding to a virtual memory address.

FIG. 6 shows one form of a data structure employed by an operating system to find a memory page in physical memory corresponding to a virtual memory address. The virtual memory address 502 is shown in FIG. 6 with the same fields and numerical labels as in FIG. 5. The operating system employs the region selector field 506 and the virtual page address 505 to select an entry 602 within a virtual page table 604. The virtual page table entry 602 includes a physical page address 606 that references a page 608 in physical memory. The offset 504 of the virtual memory address is used to select the appropriate byte location 610 in the virtual memory page 608. The virtual page table 602 includes a bit field 612 indicating whether or not the physical address is valid. If the physical address is not valid, then the operating system commonly selects a memory page within physical memory to contain the memory page, and retrieves the contents of the memory page from an external storage device, such as a disk drive 614. The virtual page table entry 602 contains additional fields from which the information needed for a TLB entry can be retrieved. Once the operating system successfully maps the virtual memory address into a physical memory address, that mapping is entered into the virtual page table entry and, formatted as a TLB entry, is inserted into the TLB.

FIG. 7 shows the access rights encoding used in a TLB entry. Access rights comprise a 3-bit TLB.ar mode field 702 that specifies read, write, execute, and combination access rights, and a 2-bit TLB.pl privilege level field 704 that specifies the privilege level associated with a memory page. In FIG. 7, the access rights for each possible value contained within the TLB.ar and TLB.pl fields are shown. Note that the access rights depend on the privilege level at which a current process executes. Thus, for example, a memory page specified with a TLB entry with TLB.ar equal to 0 and TLB.pl equal to 3 can be accessed for reading by processes running at any privilege level, shown in FIG. 7 by the letter "R" in the column corresponding to each privilege level 706-709, while a memory page described by a TLB entry with TLB.ar equal to 0 and TLB.pl equal to 0 can be accessed by reading only by a process running at privilege level 0, as indicated in FIG. 7 by the letter "R" 710 under the column corresponding to privilege level 0. The access rights described in FIG. 7 nest by privilege level according to the previous discussion with reference to FIG. 4. In general, a process running at a particular privilege level may access a memory page associated with that privilege level and all less privileged privilege levels. Using only the access rights contained in a TLB entry, it is not possible to create a memory region accessible to a process running at level 3 and the kernel running at level 0, but not accessible to an operating system running at privilege level 2. Any memory page accessible to a process running at privilege level 3 is also accessible to an operating system executing at privilege level 2.

Figure 8A:
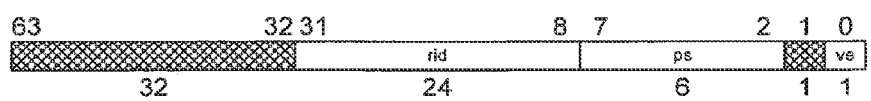
FIGS. 8A-B provide details of the contents of a region register and the contents of a VHPT long-format entry.
Figure 8B:
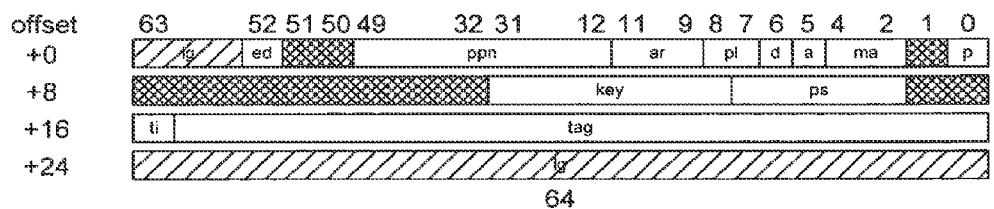

FIGS. 8A-B provide details of the contents of a region register and the contents of a VHPT long-format entry, respectively. As shown in FIG. 8A, a region register includes the following fields: (1) "ve," a 1-bit Boolean field indicating whether or not the VHPT walker is enabled; (2) "ps," a 6-bit field indicating a preferred page size for the region, where the preferred page size is $2^{ps}$; and (3) "RID," a 24-bit region identifier. A VHPT long-format entry, as shown in FIG. 8B, includes the following fields: (1) "p," a 1-bit Boolean field indicating whether or not the corresponding page is resident in physical memory and other fields in the entry contain meaningful information; (2) "ma," a 3-bit field, called "memory attribute," which describes caching, coherency, write-policy, and speculative characteristics of the mapped physical page; (3) "a," a 1-bit field that, when zero, causes references to the corresponding page to generate access faults; (4) "d," a 1-bit Boolean field that specifies generation of dirty-bit faults upon store or semaphore references to the corresponding page; (5) "pl," a 2-bit field indicating the privilege level for the corresponding page; (6) "ar," a 3-bit access-rights field that includes the read, write, and execute permissions for the page; (7) "ppn," a 38-bit field that stores the most significant bits to the mapped physical address; (8) "ed," a 1-bit Boolean field whose value contributes to determining whether to defer a speculative load instruction; (9) "ps," a 6-bit field indicating the page size for virtual-memory mapping; (10) "key," a protection key associated with the corresponding virtual page; (11) "tag," a translation tag used for hash-base searching of the VHPT; and (12) "ti," a 1-bit Boolean field indicating whether or not the translation tag is valid.

Figure 9A:
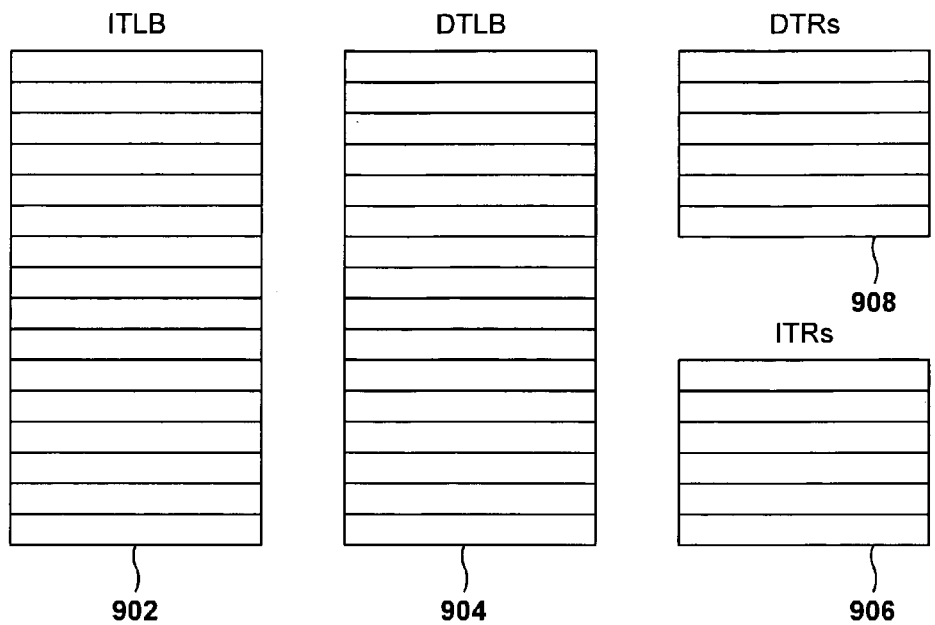
FIGS. 9A-B provide additional details about the virtual-memory-to-physical-memory translation caches and the contents of translation-cache entries.
Figure 9B:
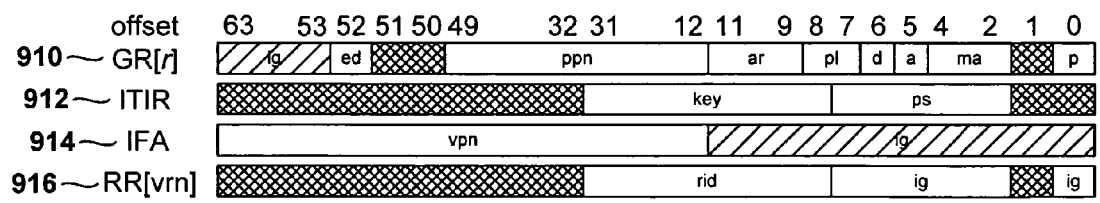

FIGS. 9A-B provide additional details about the virtual-memory-to-physical-memory translation caches and the contents of translation-cache entries. The Itanium provides four translation structures, as shown in FIG. 9A. These include an instruction TLB ("ITLB"), a data TLB ("DTLB") 904, a set of instruction translation registers ("ITRs") 906, and a set of data translation registers ("DTRs") 908. The four translation structures are together referred to as the "TLB." Entries are placed into the ITLB, DTLB, ITRs, and DTRs by using the privileged instructions itc.i, itc.d, itr.i, and itr.d, respectively. As discussed above, the ITLB and DTLB serve as a first cache for virtual-memory-to-physical-memory translations.

FIG. 9B shows the contents of registers used to insert translation-cache entries into the TLB using the above-described privileged instructions. The contents of four different registers are employed: (1) a general register 910 specified as an operand to the privileged instruction, the interruption TLB insertion register ("ITIR") 912, the interruption faulting address register ("IFA") 914, and the contents of the region register 916 selected by the most significant 3 bits of the IFA register 914. Many of the fields shown in FIG. 9B are identical to the fields in the VHPT long-format entry, shown in FIG. 8B, and are not again described, in the interest of brevity. The field "vpn" in the IFA register contains the most significant bits of a virtual-memory address. In both a VHPT entry and a translation-cache entry, the most significant bits of a physical page address and virtual-memory-page address (with page-offset bits assumed to be 0) represent the address of a first byte of a physical page and virtual-memory page, respectively. Thus, VHPT entries and TLB entries are referred to as corresponding both to virtual-memory addresses and to virtual-memory pages. The unspecified, least-significant bits of a physical-memory address or virtual-memory address an offset, in bytes, within the physical memory or virtual memory page specified by the most significant bits.

Figure 10:
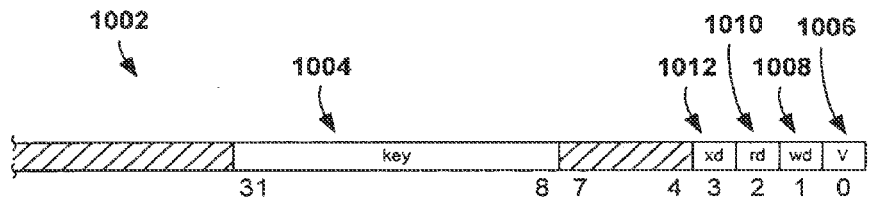
FIG. 10 provides additional details regarding the contents of protection-key registers.

FIG. 10 provides additional details regarding the contents of protection-key registers. The format for a protection-key register 1002 includes a 24-bit key field 1004 and four different single-bit fields that include: (1) a valid bit 1006, which indicates whether or not the protection-key register contains valid contents and is therefore employed by the processor during virtual-address translation; (2) a write-disable bit 1008, which, when set, results in write access denied to pages, the translations for which include the protection key contained in the protection-key field 1004; (3) a read-disable bit, which, when set, disables read access to pages, the translations for which contain the key contained in the key field 1004; and (4) an execute-disable bit 1012, which, when set, prevents execute access to pages, the translations for which contain the key contained in the key field 1004. The read-disable, write-disable, and execute-disable bits in protection key registers provide an additional mechanism to control access to pages, on a key-domain basis rather than on a per-page-access-rights basis.

Embodiments of the Present Invention

Figure 11:
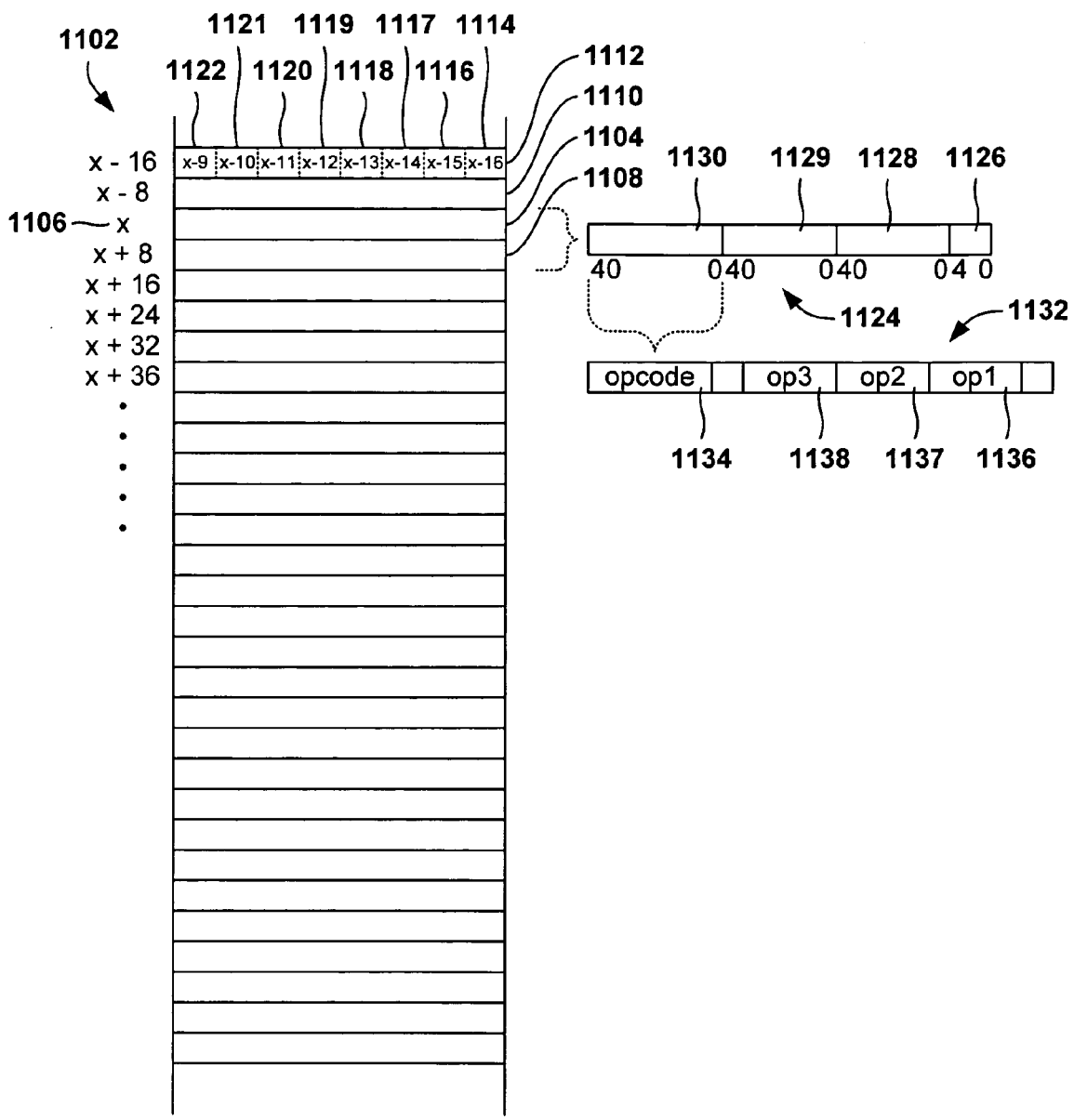
FIG. 11 illustrates a portion of a computer memory and storage of a portion of an executable program in the portion of computer memory.

FIG. 11 illustrates a portion of a computer memory and storage of a portion of an executable program in the portion of computer memory. The memory layout and executable-code formatting shown in FIG. 11 is that of the Intel® Itanium architecture. Different types of computers, implemented according to different types of computer architectures, employ different memory and executable-code conventions. However, the principles illustrated for the Itanium-architecture memory and executable-code conventions are general, and apply over a broad range of different types of computers and computer architectures. The computer memory, represented in FIG. 11 by a column 1102 of 64-bit memory words, can be considered to be a very long, ordered sequence of computer words, each word having a distinct address. In general, a computer architecture specifies a natural word size, in the case of Itanium architecture, 64 bits or eight bytes. Different computer architectures and types of computers specify different natural word lengths. For example, in current personal computers ("PCs"), the natural word length is generally 32 bits or four bytes. Different computer architectures and types of computers use different granularities of addressability. In the Itanium architecture, the granularity of addressability is configurable over a range of granularities. For purposes of discussing the present invention, it is assumed that the granularity of addressability is a single byte.

In FIG. 11, an arbitrarily selected 64-bit word 1104 is assigned, for descriptive purposes, the arbitrary address "X" 1106. In general, memory-word addresses are of length 64 bits, so that each natural computer word can store a single address. The address "X" is the byte address of the least significant byte, or lowest-addressed byte, in the 64-bit computer word 1104. The address of the next computer word 1108 in memory is therefore "X+8," and the address of the previous word 1110 is "X−8," The individual bytes within the 64-bit word 1112 at address "X−16" are explicitly shown in FIG. 11, labeled with their byte addresses. The first, lowest-addressed byte 1114 is shown in FIG. 11 with address "X−16," and the next, successive, higher-addressed bytes 1116-1122 appear to the left of the lowest-addressed byte 1114 within computer word 1112. The memory layout and addressing conventions illustrated in FIG. 11 apply both to memory that stores executable code as well as a memory that stores data. Whether the contents of a memory page are executable instructions or data may be fully or partially determined by the access rights associated with the page, and if not fully determined by the access rights, are ultimately determined by whether or not a stored program attempts to execute what the stored program considers to be instructions within the page.

In the Intel® Itanium architecture, computer instructions are stored in 128-bit bundles. Each 128-bit, or 16-byte, instruction bundle includes up to three instructions. For example, in FIG. 11, the two, adjacent computer words at addresses "X" and "X+8" 1104 and 1108 together store a single instruction bundle 1124. The instruction bundle 1124 includes a first, five-bit field 1126 that encodes a value that directs the instruction bundle to a particular type of instruction-execution submit within an Itanium processor. The instruction bundle 1124 additionally contains three instructions 1128-1130, each of length 41 bits. Each instruction, in turn, contains a number of different fields. In FIG. 11, an expanded view of the last instruction 1130 in instruction bundle 1124 is shown 1132 below the instruction bundle 1124. The formats for instructions vary significantly from instruction to instruction. However, in general, an instruction contains an op code 1134, and most instructions include operands, or arguments. For example, instruction 1132 in FIG. 11 includes three operands 1136-1138. In memory containing a stored program, each successive pair of 64-bit words contains a next instruction bundle. In many older computer architectures, instructions are executed in the order in which they are stored in memory. The Itanium architecture, like many modern processor architectures, is somewhat more complex, and features massive pipelining and parallel execution of as many as six instructions. However, for the purposes of describing the present invention, a stored program can be thought of as a sequence of successively stored instruction bundles within memory that appear to be sequentially executed in the order that they are stored, from lower addresses to higher addresses in memory. It should also be appreciated that, without knowing the access rights associated with a memory page containing a particular computer word, or knowing whether a particular computer word will be attempted to be executed by a program, it is often impossible to determine, based on the contents of the computer word alone, whether the computer word represents stored data or one word of a two-word instruction bundle. In fact, the same memory word may be, in certain cases, treated as data, and, in other cases, executed as a portion of an instruction bundle.

It should be noted that the described embodiment of the present invention depends on the fact that Itanium instructions have non-overlapping instruction-argument fields, and that, for each type of instruction, the position of instruction-argument fields is constant. Alternative embodiments employ more complex instruction representations to handle architectures in which instruction-argument fields are non-constant, overlapping, or both.

Figure 12:
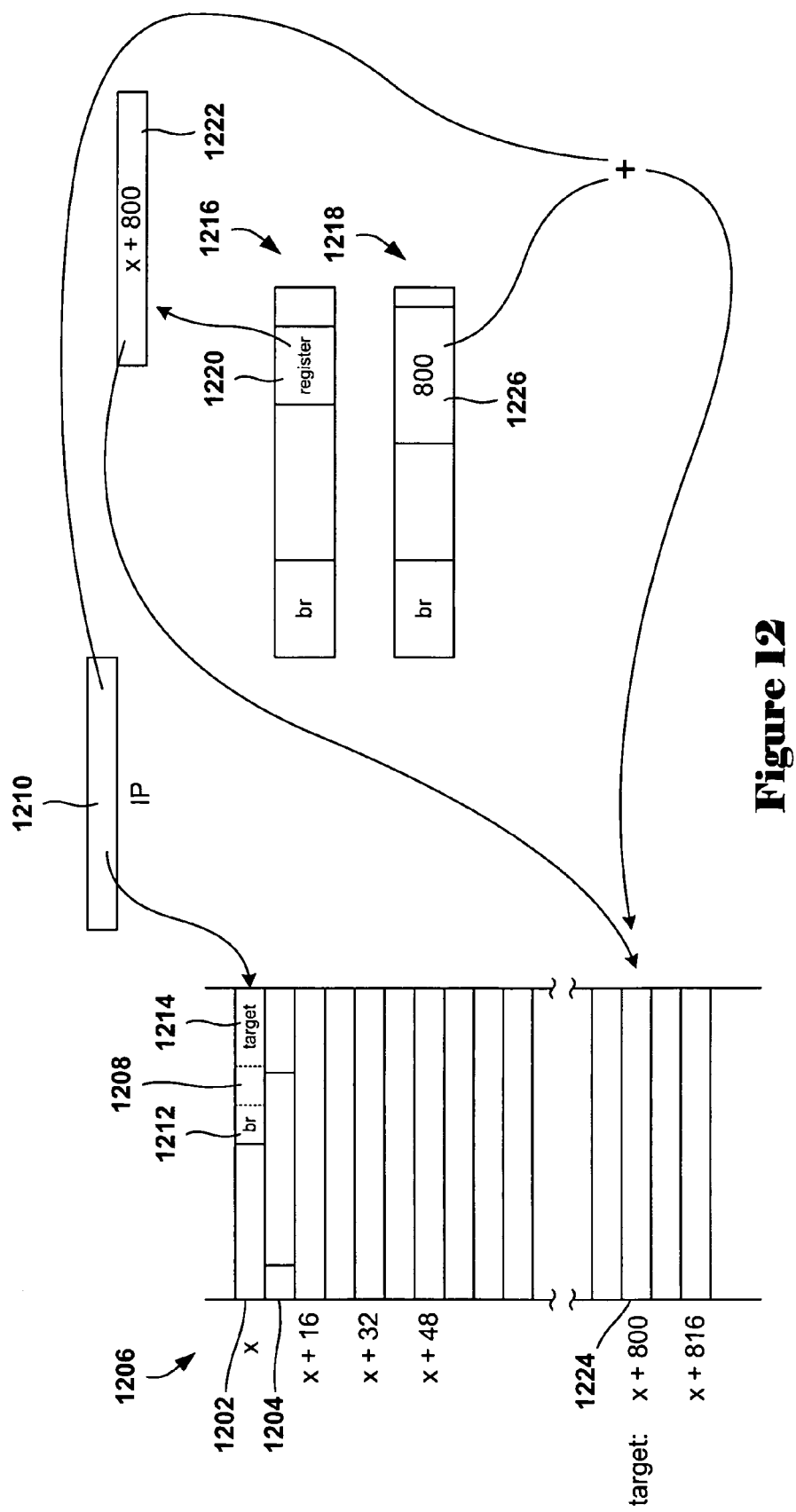
FIG. 12 illustrates immediate and register operands in the context of a branch instruction.

FIG. 12 illustrates immediate and register operands in the context of a branch instruction. As shown in FIG. 12, the 64-bit words 1202 and 1204 of a portion of memory 1206, at addresses "X" and "X+16," contain a three-instruction instruction bundle, the second instruction of which, 1208, is a branch instruction. A branch instruction is used to alter the contents of the IP register 1210 to contain the address of an instruction bundle other than the instruction bundle that follows the currently executing instruction bundle, thereby affecting a machine-level goto operation. As shown in FIG. 12, the branch instruction includes a numeric op code 1212 that specifies that the instruction is a branch instruction, as well as a single operand 1214 that specifies the target instruction bundle for the branch operation, or the destination instruction of the goto operation represented by the branch instruction. The target operand can be specified in several different ways in different subtypes of the branch instruction.

In FIG. 12, an indirect branch instruction 1216 and an IP-relative branch instruction are illustrated. The target operand of the indirect branch instruction 1216 1220 is a seven-bit field within the branch instruction that numerically specifies one of the 8 branch registers. For example, in FIG. 12, the register field 1220 specifies a particular branch register 1222. If the branch instruction specifies transfer of execution to a target instruction 1224 at address "X+800," then the branch register 1222 specified by the register operand 1220 of the indirection branch instruction 1216 contains the address "X+800." An indirection branch instruction 1216 can therefore transfer execution control to any 64-bit address accessible to the currently executing program. The IP-relative branch instruction 1218 has a target operand field 1226 that contains an offset from the address of the branch instruction to the target instruction to which execution is transferred by the branch instruction. In FIG. 12, for example, the target operand 1226 includes an encoding of the numeric value "800," which is added to the contents of the IP register 1210 during execution of the IP-relative branch instruction 1218 in order to load the IP register with the address "X+800" of the target instruction 1224. The indirect branch instruction 1216 therefore includes a register operand, the most general type of operand for a computer instruction, while the IP-relative branch instruction 1218 includes an immediate operand, which, in the case of the IP-relative branch instruction, numerically encodes a value used during execution of the instruction. Note, because the immediate-operand, target field 1226 of the IP-relative branch instruction has a length, in bits, significantly shorter than the 64-bit natural word size, the IP-relative branch instruction can only transfer execution control to other instructions within a limited range of instructions preceding and following the branch instruction.

Figure 13:
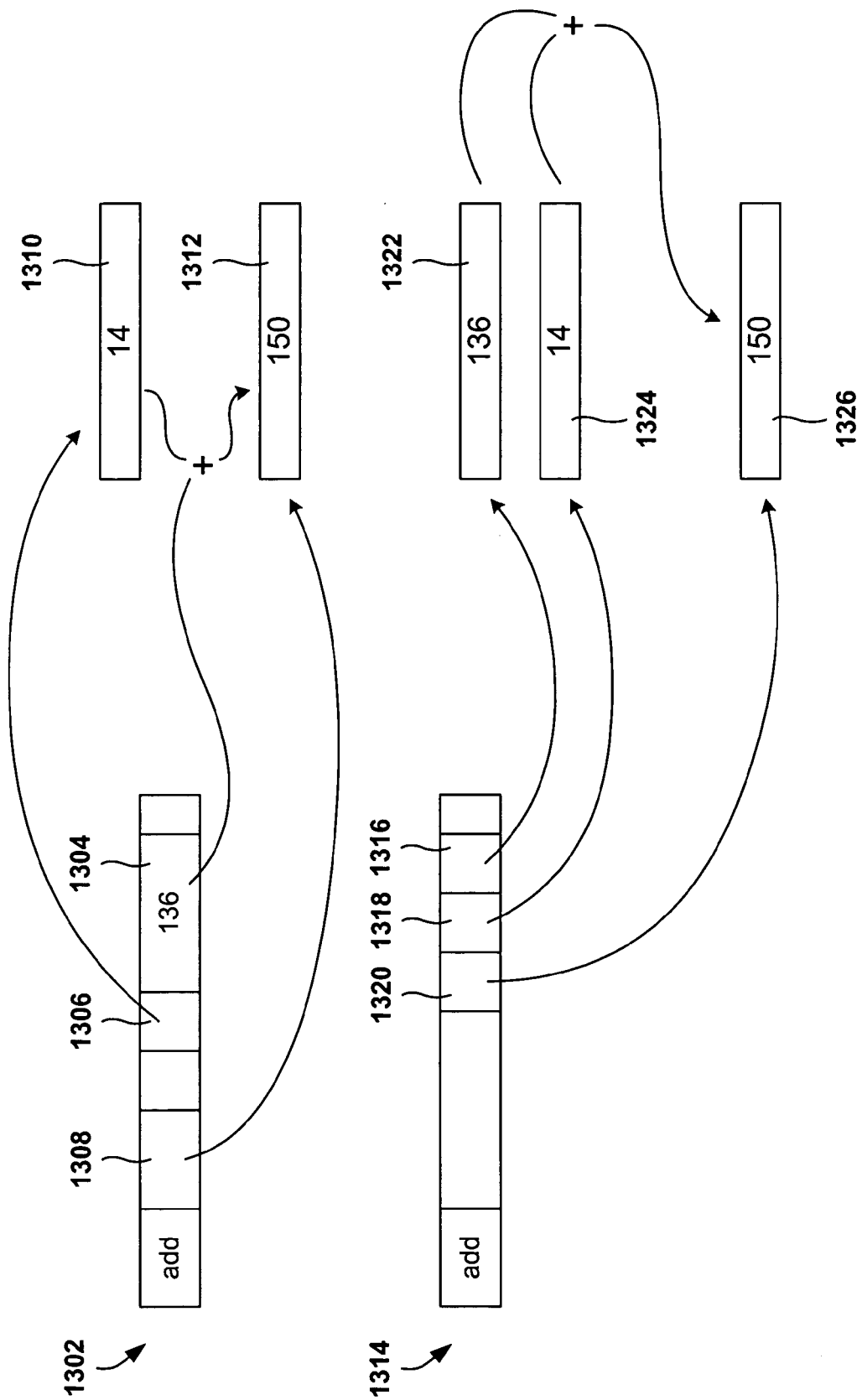
FIG. 13 illustrates two forms of an add instruction.

FIG. 13 illustrates two forms of an add instruction. In the first form of add instruction 1302 shown in FIG. 13, the add instruction includes an immediate operand 1304, a register operand 1306, and a target operand 1308 that is also a register operand. This form of the add instruction adds the numerical value encoded in the immediate operand 1304 to the contents of the register 1310 specified by the second operand 1306 to produce a numerical result stored in the target register 1312 specified by the target, register operand 1308. A second type of add instruction 1314 shown in FIG. 13 includes three register operands 1316, 1318, and 1320. This second type of add instruction adds the contents of the register 1322 specified by the first register operand 1316 to the contents of the register 1324 specified by the second register operand 1318 to produce a numerical result that is stored into the contents of the register 1326 specified by the third register operand 1320. Note that, in FIGS. 12 and 13, the numerical values are shown as decimal values.

There are many ways to implement a virtual-machine monitor. In one, traditional approach, guest-operating system code is preprocessed to identify and replace individual instructions and/or groups of instructions, execution of which would pose problems to the virtual-machine monitor. In many cases, the virtual-machine monitor can trap problematic instruction execution dynamically, at run time, and emulate the problematic instructions on behalf of the guest operating system. In other cases, the virtual-machine monitor needs to recognize, in advance, the presence of the problematic instructions or instruction blocks and either replace them prior to their execution by the guest operating system or introduce additional instructions before or after the problematic instruction or instruction blocks to either generate interrupts or to modify the machine state to correspond to a machine state expected by the guest operating system as a result of execution of the problematic instruction or instruction blocks. Either when preprocessing guest-operating system code to modify the code in advance of the execution, or when dynamically modifying pages containing executable code, a virtual-machine monitor needs to be able to quickly scan memory in order to identify particular instructions or instruction blocks that the virtual-machine monitor needs to replace, enhance, or introduce interruptions associated with the instructions or instruction blocks.

Figure 14:
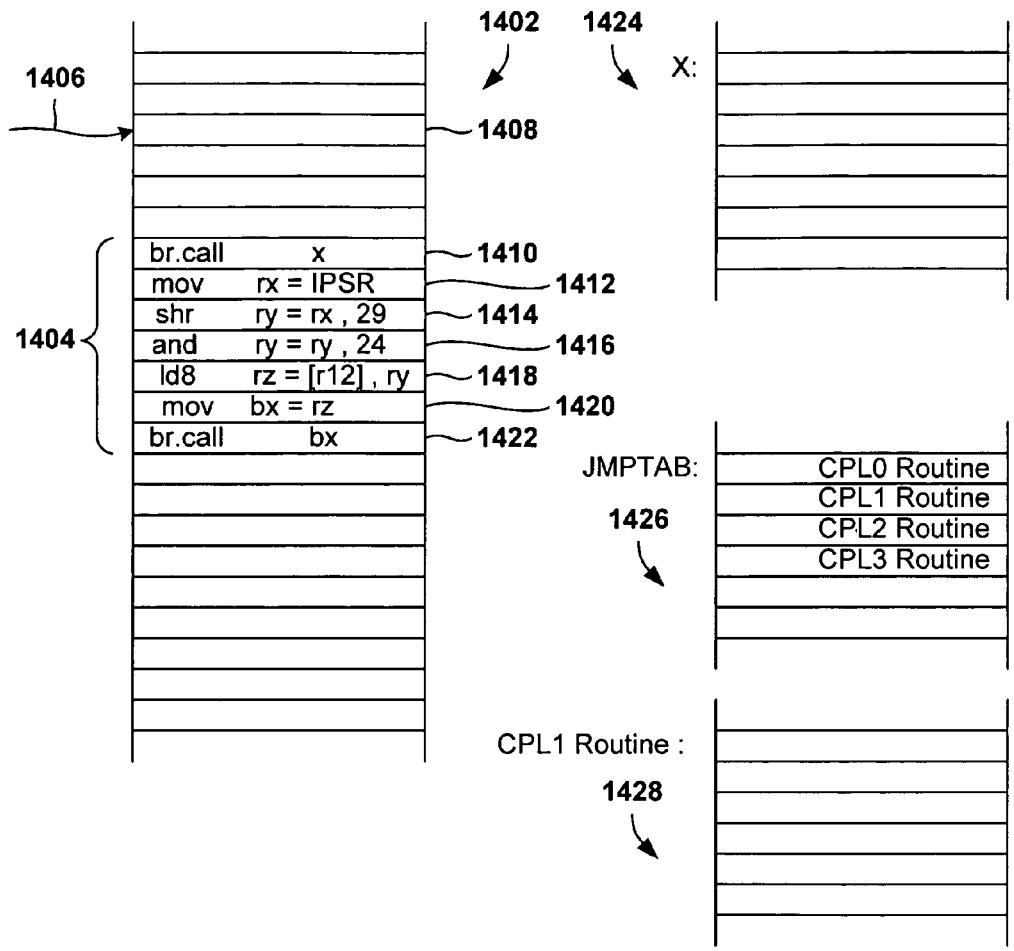
FIG. 14 provides an example instruction block within the executable code of a guest operating system that needs to be recognized by a virtual-machine monitor.

FIG. 14 provides an example instruction block within the executable code of a guest operating system that may need to be inserted by a virtual-machine monitor. This example is used in following discussions of the instruction and instruction-block recognition techniques that represent various embodiments of the present invention. FIG. 14 shows a small portion of memory 1402, illustrated in the style of FIGS. 11 and 12. The short section of memory stores seven instructions that together comprise an instruction block 1404 that allows a guest operating system to call a particular routine from an interrupt handler depending on the privilege level at which the interruption occurred. In FIG. 14, the memory 1402 is shown as containing a single instruction in each memory word. As discussed earlier, the Itanium architecture stores three instructions in each pair of 64-bit words. An instruction-per-word convention is adopted in FIG. 14, and in subsequent Figures, to facilitate discussion of instruction recognition without the overhead of the extra procedural steps needed for unbundling instructions from instruction bundles and disregarding the non-instruction field at the end of the instruction bundle. Those skilled in the art can appreciate that no generality is lost in adopting an instruction-per-word paradigm for describing embodiments of the present invention. Moreover, in many computer architectures, a single instruction is, in fact, stored in every natural word of a memory section storing executable code.

The arrow 1406 in FIG. 14 points to the first memory location 1408 containing code for an interrupt handler of a guest operating system. When a particular type of interruption occurs, the guest-operating-system interruption handler begins executing at the instruction stored in memory location 1408. After executing four instructions, the interruption handler executes instruction block 1404 in order to call a particular routine corresponding to the privilege level at which the interrupted routine was executed. First, a different routine at location "X" is called via the branch instruction at memory location 1410. This routine returns the memory address of a jump table in register $r_{12}$. Next, the contents of the IPSR register is moved into one of the general registers, $r_x$, by the move instruction stored at memory location 1412. The contents of register $r_x$ is then right shifted 29 places, by the instruction stored at memory location 1414, in order to store the numerical value of the privilege level at which the interruption occurred, multiplied by eight, into general register $r_y$. The contents of register $r_y$ is then logically anded with the decimal number "24," by the instruction stored at memory location 1416, to mask out the non-privilege level fields of the shifted IPSR-register. Next, the contents of register $r_y$ is used as an index into the jump table, the base address of which is stored in register $r_{12}$, to obtain the address of a routine in register $r_z$, by the load instruction stored at the memory location 1418. Finally, the address of the routine to be called is moved into a branch register, by the move instructions stored in the memory location 1420, and the routine is then called by the br.call instruction stored at memory location 1422. While the instruction block 1404 is stored in contiguous memory locations in the interruption-handling code, the routine called by the br.call instruction at location 1410 is stored at a different position 1424 in memory, as shown in FIG. 14. The jump table from which the address of the routine to be called is extracted by the load instruction at memory location 1418 is positioned at yet a different place in memory 1426. Finally, the routine to be called is located at yet a different place in memory 1428.

Figure 15:
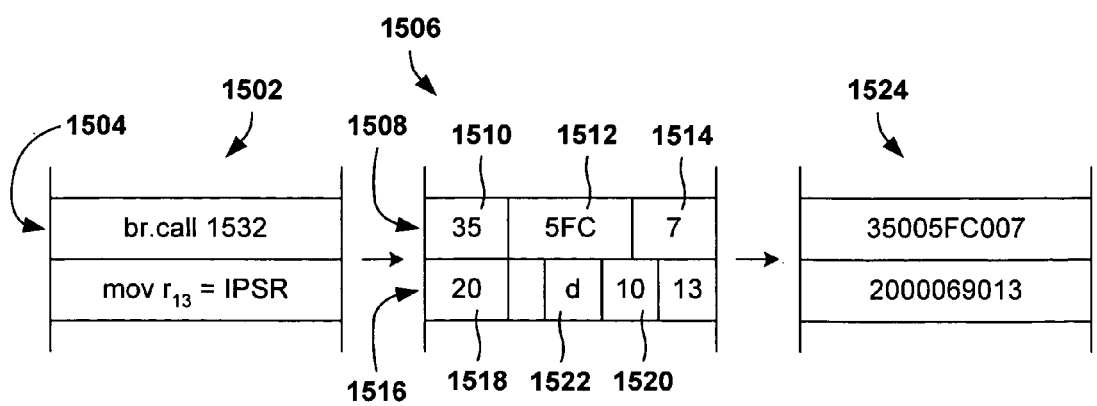
FIG. 15 illustrates conversion of the first two instructions of the instruction block shown in FIG. 14 to numerical values.

When the relative positions of the instruction block 1404, the memory location of the routine called to return the jump-table address 1424, the memory location 1426 of the jump table, and the memory locations of the routines to be called, such as the routine at memory location 1428, are all fixed, so that any IP-relative addresses or absolute addresses in the instruction block 1404 are constant, regardless of the version or build of the guest operating system, then the instructions in the instruction block have constant numerical values. Similar considerations apply to many different types of instructions, such as add instructions used to compute offsets for fields of structures that may vary, from software version to software version. FIG. 15 illustrates conversion of the first two instructions of the instruction block shown in FIG. 14 to numerical values. In a first view of the stored instructions 1502, the instructions are shown in mnemonic form, with the relative offset for the routine at memory location "X" replacing target address "X" for the branch instruction 1504. As discussed above, instructions can be viewed as units of memory with various different fields. That view is displayed in view 1506 of the two instructions in FIG. 15. For example, the branch instruction 1508 includes an op code field 1510, an immediate operand containing the hexadecimal representation of the target routine offset 1512, and various additional fields 1514. Similarly, the move instruction 1516 includes an op code 1518, a register operand 1520 specifying the application-register-number of the IPSR register in hexadecimal notation, "10," and a second register operand 1522 specifying the register $r_x$ in which the contents of the IPSR register are to be moved. In the specific example shown in FIG. 15, the register $r_x$ is specified as register $r_{13}$ by the hexadecimal representation for the number "13,""D."

It should be pointed out that the op codes, instruction fields, locations, and sizes used for the examples shown in FIG. 15 and subsequent figures, are hypothetical, and do not correspond to the actual op codes and instruction formats of the Itanium architecture. Those skilled in the art will recognize that the particular numerical values of op codes and formats for instructions are irrelevant to a description of general techniques for instruction recognition. The various embodiments of the present invention are directed not only to the Itanium architecture, but to any well-described computer architecture. In a final view of the two instructions 1524, the two instructions are viewed essentially as numerical values, or data values, stored in memory locations. In other words, the separate hexadecimal values shown for the fields in view 1506 are combined together in a single 64-bit number displayed for each instruction in view 1524. In fact, in a computer memory, all data and instructions are represented as one or more 64-bit numbers.

Thus, if a virtual-machine monitor, or other code-recognizing program, seeks to insert the first two instructions of the instruction block 1404 shown in FIG. 14 into the guest-operating-system code, the virtual-machine monitor or other code-recognition program needs simply to copy constant-valued representations of the instructions into the appropriate location in the code. This, in fact, represents a current approach to code replacement and insertion in virtual-machine monitors and other code-recognizing programs. That approach is embodied in a short, C-like pseudocode routine illustrating generation of a block of instructions for patching into a guest operating system or into other executable code by a virtual-machine monitor or other code-modifying program:

```
1  void insert1(instruction* position, instruction* blk, int blkLength)
2  {
3      int i;
4
5      for (i = 0; i < blkLength; i++)
6      {
7          *position++ = *blk++;
8      }
9  }
```

The routine "insert1" receives three parameters: (1) "position," a pointer to the location in executable code to insert the instruction block; (2) "blk," a pointer to the instruction block to insert; and (3) "blkLength," an integer argument specifying the number of instructions in the block of instructions to insert into the code. In the for-loop of lines 5-8, the routine "insert1" simply writes each instruction of the block of instructions into successive positions within the executable code, starting with the position preferenced by the argument "position."

The approach represented by the above-described routine "insert1" works quite well in the case that the instruction block has a constant encoding, regardless of the version or build of the guest operating system code into which the instruction block is inserted by a virtual-machine monitor. However, in general, guest operating systems and other code may have many different variations, and may be quite often re-compiled and re-linked. In general, each time the code is modified, there is a significant chance that the relative offsets of the instruction block to other routines and data called from and accessed by the instruction block may change. In this case, the target addresses and IP-relative offsets for data and called routines change, resulting in a change in the numerical values corresponding to instructions of the instruction block in different variations of the guest operating system or other code that is analyzed to find instruction blocks.

Figure 16:
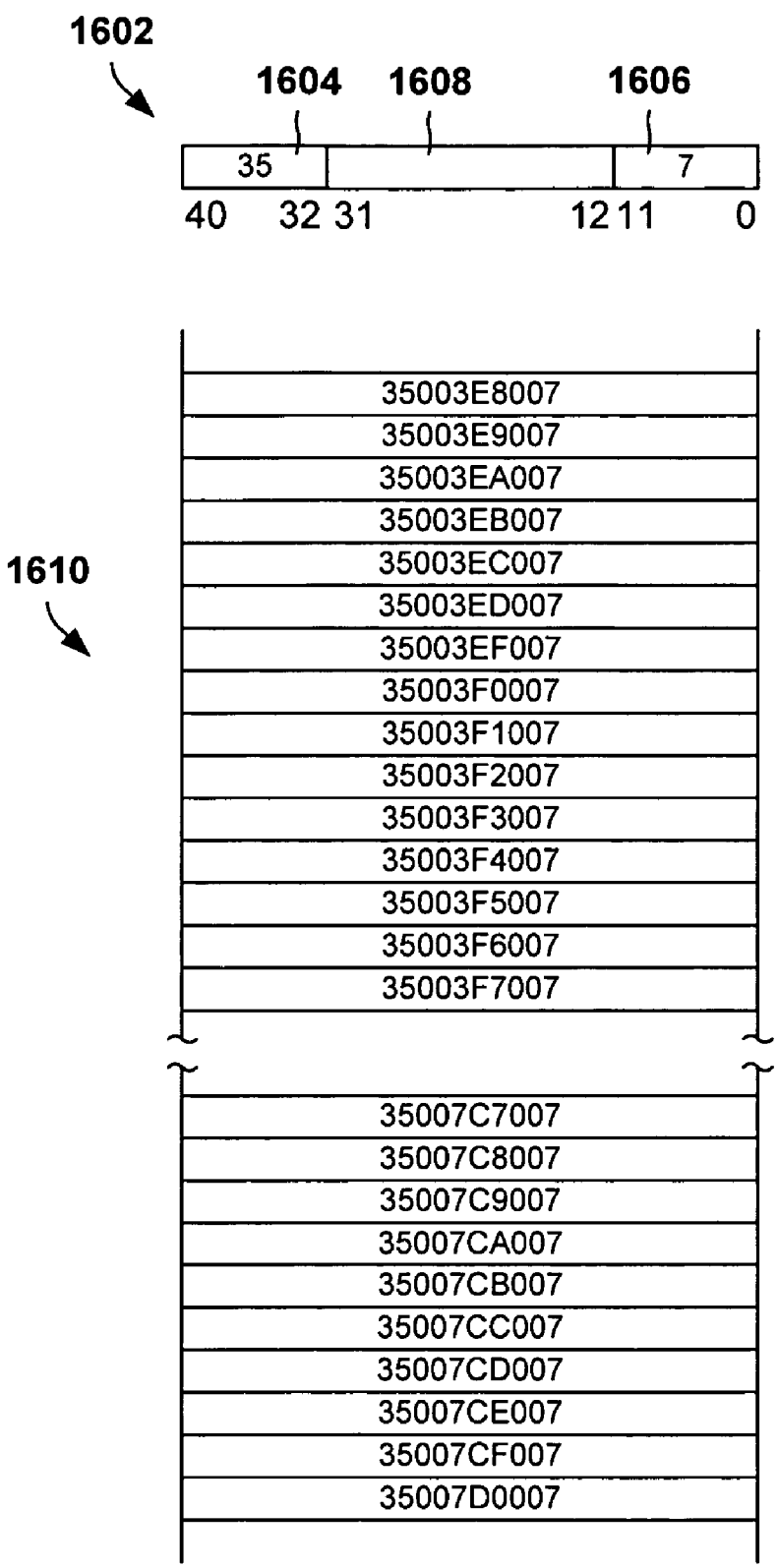
FIG. 16 illustrates various numerical forms of the branch instruction that may obtain due to changes in the interruption handler and guest-operating-system code in which the interruption handler is included.

As an example of the non-constant numerical value stored in memory corresponding to an instruction, consider the first br.call instruction of the exemplary instruction block shown in FIG. 14. FIG. 16 illustrates various numerical forms of the branch instruction that may obtain due to changes in the interruption handler and guest-operating-system code in which the interruption handler is included. FIG. 16 shows a representation of the branch instruction 1602 including the constant op code field 1604 and various fields at the end of the instruction 1606 that presumably also have a constant value. However, in the case illustrated in FIG. 16, it is known that the guest-operating-system code may be frequently rebuilt, changing the relative offset from the instruction block (1404 in FIG. 14) to the routine called at memory location "X." In other words, the absolute memory location of the instruction block, the called routine, or both the instruction block and called routine may be altered in a subsequent recompilation or re-linking of the guest operating system. It is further assumed, in the case of the described hypothetical problem, that, despite the changes in relative offsets that may occur due to recompilation or re-linking, the location of the target routine (1024 in FIG. 14) will always occur in an offset of between 1,000 and 2,000 bytes. Thus, the contents of the immediate-operand field 1608 of the branch instruction may vary from 1,000, hexadecimal representation "3E8," to 2,000, hexadecimal representation "7D0." Therefore, assuming that the op code and additional field values are constant, the numerical representation of the branch instruction may have any of 1,000 different values shown in the table 1610 in FIG. 16. In many architectures, including the Itanium architecture, the instructions or instruction bundles containing the instructions may be word aligned, so that, in fact, only one-quarter of the possible values shown in Table 1610 may be expected to occur. Nonetheless, the point in FIG. 16 is to indicate that, when it cannot be assumed that the relative positions of an instruction block and all additional memory regions containing data and/or executable code accessed by the instruction block are fixed, as is the case with recompiled and/or re-linked guest operating system code, any particular instruction may occur within the guest-operating-system code in many different numerical forms.

Figure 17:
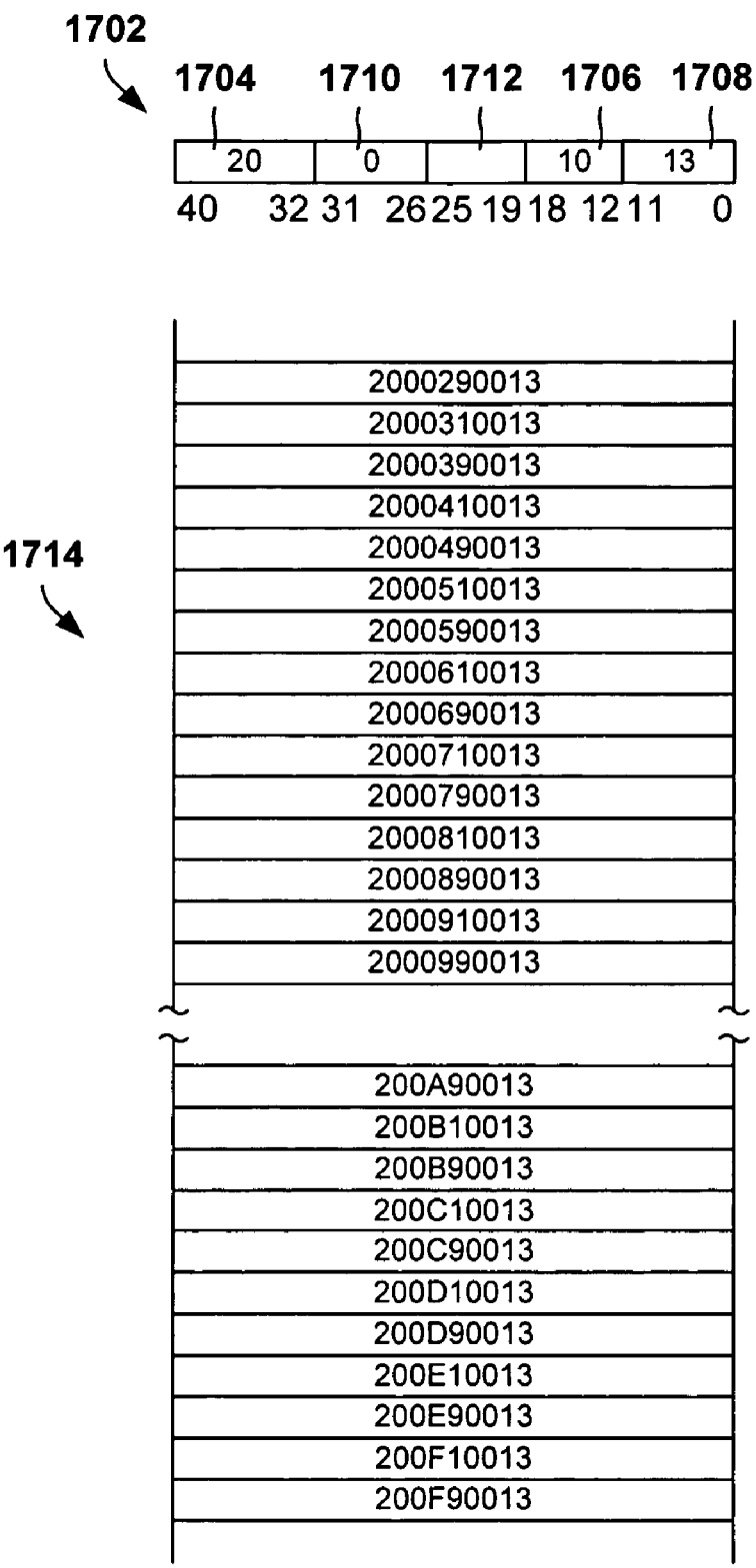
FIG. 17 illustrates the non-constant numerical representation of the second instruction of the exemplary instruction block shown in FIG. 14.

FIG. 17 illustrates the non-constant numerical representation of the second instruction of the exemplary instruction block shown in FIG. 14. In the case of the second, move instruction (1412 in FIG. 14), fewer alternative numerical representations can be expected. A formatted representation 1702 of the move instruction is shown in FIG. 17. The move instruction includes a constant op code field 1704, and a constant register operand 1706 specifying the IPSR register, as discussed above. Presumably, the additional fields 1708 at the end of the instruction 1702 have a constant value, regardless of the particular compilation or linking version of the code, and an intervening field 1710 not used in the move instruction also is assumed to have a constant value "0." Therefore, in the case of the move instruction 1702, the only expected variation is in the register operands field 1712 that specifies the register $r_x$ into which the contents of the IPSR register are moved. This field can specify any of the 128 general registers, but it is further assumed, in the case of the described hypothetical problem, that compilers will only use one of registers $r_5$ through $r_{31}$ for this move instruction. Therefore, as shown in the table 1714 in FIG. 17, there are 27 different possible numerical values corresponding to the second, move instruction (1412 in FIG. 14). Note that, as with the alternative numerical values for the branch instructions shown in FIG. 16, the alternative values for the move instruction are not simply a set of monotonically increasing values. Because the contents of an inner field of the instruction may vary, the numerical value representations of the entire instruction increase by a rather large increment, in the case of the move instruction by the hexadecimal value "80000."

The consequences of the large number of possible numerical representations of instructions within instruction blocks located in guest-operating-system code that may be recompiled, re-linked, or otherwise modified, are rather profound. For example, just considering the first two instructions of the exemplary instruction block shown in FIG. 14, there may be 1000×27=27,000 different numerical representations for the two-instruction sequence. Any of potentially 27,000 different variations of the two-instruction sequence may need to be inserted into the guest operating system, depending on the version or build of the guest operating system.

A C-like pseudocode implementation of a slightly more complex routine, "insert2," that handles the potential variability in inserted instruction blocks is next provided:

```
1  void insert2(instruction* position, instruction** blks, int* blkIndexes,
      int numBlks)
2  {
3      instruction* blk;
4      int i;
5
6      for (i = 0; i < numBlks; i++)
7      {
8          blk = *blks++;
9          *position++ = *(blk + *blkIndexes++);
10     }
11 }
```

Because the executable code into which the instruction block is to be inserted may be alternatively complied and/or linked, and therefore the instructions do not have constant forms, the routine "insert2" is provided with blocks of instructions for each instruction to be inserted, and indices into the blocks of instructions to specify which of the different possible forms of the instructions are to be selected and inserted into the executable code. The routine "insert2" has a form similar to the above-described routine "insert1." The routine "insert2" receives the following arguments: (1) "position," a pointer to the location in the executable code at which to begin inserting instructions; (2) "blks," a pointer to an array of blocks of instructions, each block of instructions in the array representing all possible alternative forms of instruction that may be inserted into the executable code; (3) "blkIndexes," a pointer to an array of integer indices that specify the particular forms of instructions in the blocks of instructions to extract and insert into the executable code; and (4) "numBlks," an integer specifying the number of blocks of instructions in the array of blocks of instructions and the number of indices in the array of indices. In the for-loop of lines 6-10, the routine "insert2" iteratively selects a pointer to a next block of instructions, and then uses a next index from the array of indices to select a particular instruction from the block of instructions and insert the instruction into the executable code.

The routine "find2" is, like the routine "insert1" quite simple and quite straightforwardly implemented. The actual task of inserting a block of instructions, represented by the routine "insert2" can be efficiently carried out by a virtual-monitor interruption handler or other code-modifying routine or program. However, this approach depends on having, for those instructions that do not have constant forms, blocks of alternative forms of each instruction to be inserted, similar to the blocks of instructions shown in FIGS. 16 and 17. However, as illustrated in the example shown in FIG. 16, the blocks of alternative forms of instructions may be extremely long. These blocks of instructions may be so long that they may not be easily contained within available memory, and, even if provision can be made to store and access the lengthy blocks of alternative forms of instructions in memory, the paging overhead may cause significant performance degradation of a virtual-machine monitor or other code-modifying program. An additional deficiency in this approach is that producing error-free blocks of alternative forms of instructions may be non-trivial. In general, as the size of human-generated information increases, the probability that the human-generated information may contain errors and omissions increases dramatically. Insertion of erroneous instructions by a virtual-machine monitor may have profound impacts on the execution of a virtualized guest operating system, and may be exceedingly difficult to detect and debug. For all of these reasons, the approach represented by the routine "insert2" is at least less than satisfactory, and, in many cases, not feasible.

For this reason, designers, implementers, vendors, and user of virtual-machine monitors, and other such programs that need to insert and/or replace code sequences, have recognized a need for a more efficient method for instruction-block insertion and replacement into code sequences included in programs that may be frequently recompiled, re-linked, or otherwise modified. Embodiments of the present invention provide efficient instruction and instruction-block insertion and replacement methods.

Various embodiments of the present invention employ a description of an instruction block that allows for efficient instruction-block insertion and replacement. The description encapsulates the constant, non-changing portion of instructions. The description also provides a description of the variable fields of interest, so that specific values for these variable fields of interest can be inserted from the code sequence for use by code-analysis routines.

Figure 18:
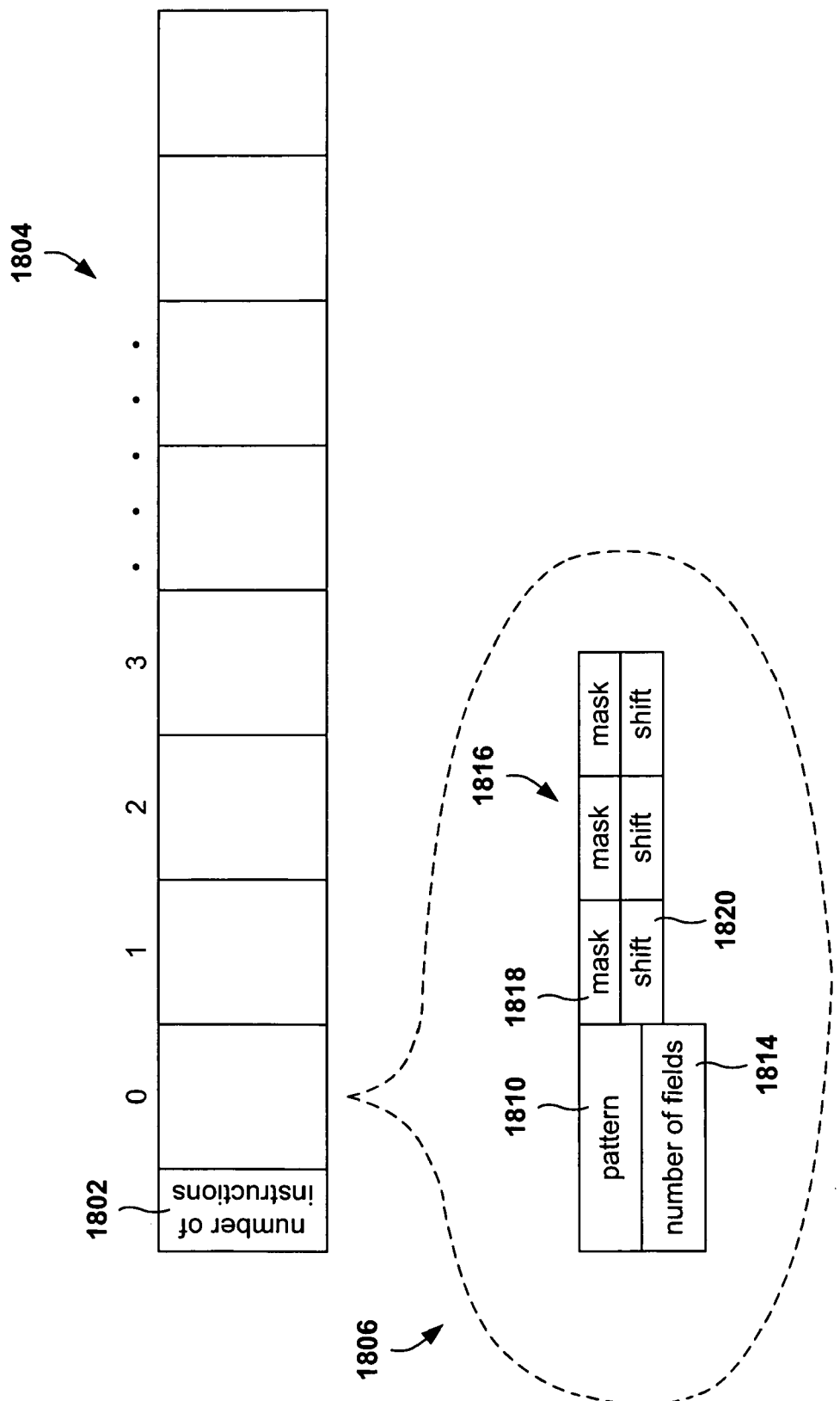
FIG. 18 illustrates a data structure used in one embodiment of the present invention to describe an instruction block.

FIG. 18 illustrates a data structure used in one embodiment of the present invention to describe an instruction block. As shown in FIG. 8, the data structure consists of an integer 1802 that specifies the number of instructions in the instruction block, and an array 1804 containing instances of an instruction-specific data structure that describe each instruction in the instruction block separately. For example, in the array 1804 shown in FIG. 18, the first instruction-specific data structure 1806 is contained in the first cell of the array 1804. A specific instance of an instruction-specific data structure 1808 is shown below the data-structure representation 1802 and 1804. The instruction-specific data structure includes two integer fields: (1) a pattern 1810 that represents the numerical value for the constant portion of the instruction; and (3) an integer value 1814 that specifies the number of operand fields in the instruction. The operand fields are separately described by operand-field data structures stored within an operand-field-data-structure array 1816. Each operand-field data structure includes a mask, such as mask 1818, and a numerical shift value, such as shift value 1820. The mask is a numerical value that, when logically anded with an instruction, leaves only the right-shifted value for the particular operand field left in the resulting numerical value. That resulting numerical value can then be left shifted by the shift value, such as shift value 1820, to generate an integer representation of the contents of the particular operand field in a candidate instruction at the proper location within the instruction.

Figure 19:
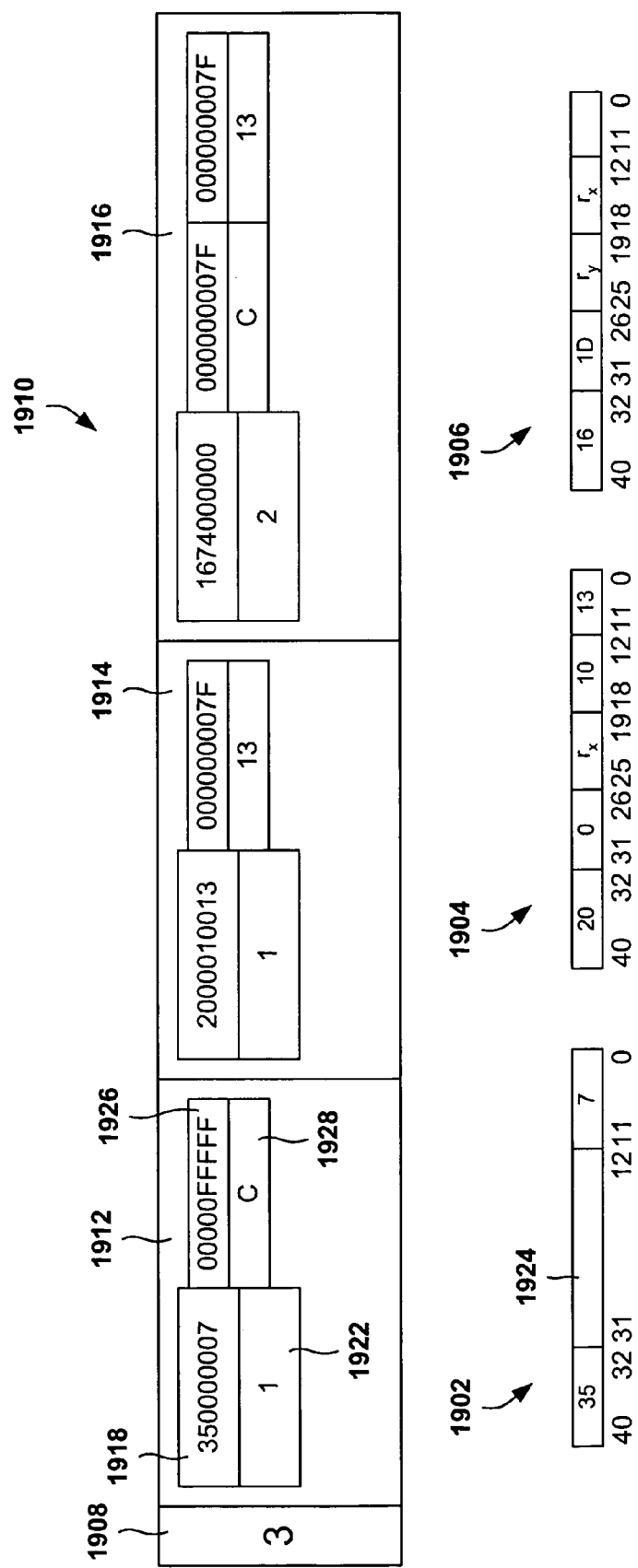
FIG. 19 illustrates the data structure shown in FIG. 18, used in one embodiment of the present invention, for an instruction block including the first three instructions of the exemplary instruction block shown in FIG. 14.

FIG. 19 illustrates the data structure shown in FIG. 18 for an instruction block including the first three instructions of the exemplary instruction block shown in FIG. 14. The three instructions are shown in formatted form in FIG. 19, 1902, 1904, and 1906, respectively. Because the instruction block includes three instructions, the number 3 is included in the number-of-instructions field 1908 of the instruction-block-representing data structure 1910. Next, the instruction-specific data structures 1912, 1914, and 1916 are shown in each of the cells of the instruction-specific-data-structure array portion of the instruction-block-representing data structure 1910. For example, for the first branch instruction 1902, the numerical value of the constant portion of the instruction, is included in the pattern field 1918 of the instruction-specific data structure 1912 for the first, branch instruction 1902. The value "1" is shown in the number-of-fields field 1922 of the instruction-specific data structure to indicate that only one operand field is of interest in the instruction 1902. The operand field of interest 1924 is the immediate-operand target for the branch instruction, a mask of which is stored in the mask field 1926 and a shift for which is stored in the shift field 1928. If the mask "00000FFFFF" is applied to a field value, only the bits of the field value that can fit into the immediate operand field 1924 will remain. Left-shifting those bits by the hexadecimal value "C" shift the immediate operand target value to a proper alignment within a 64-bit word.

The instruction-block-representing data structure, illustrated in FIGS. 18 and 19, allows for insertion of the constant portions of instructions of an instruction block into a code sequence, and for insertion of specific values of potentially variable fields within the instructions by a code-processing routine, such as a virtual-machine monitor.

A C-like pseudocode implementation of a routine that employs the data structure, illustrated in FIGS. 18 and 19, that represents an instruction block for insertion into executable code, is next provided:

```
 1  typedef int instruction;
 2
 1  typedef struct field {
 2      instruction mask;
 3      int offset;
 4  } FIELD;
 5
 6  typedef struct inst {
 7      instruction pattern;
 8      int numFields;
 9      FIELD* fields;
10  } INST;
11
12  typedef struct pat {
13      int num;
14      INST* instructions;
15  } PAT ;
 1  void insert3 (instruction* position, PAT* p, int* fieldValues)
 2  {
 3      INST* q;
 4      FIELD* f;
 5      int i,j;
 6      instruction next1, next2;
 7
 8      q = p->instructions;
 9      for (i = 0; i < p->num; i++)
10      {
11          f = q->fields;
12          next1 = q->pattern;
13          for (j = 0; j < q->numFields; j++)
14          {
15              next2 = *fieldValues++;
16              next2 &= f->mask;
17              next2 = next2 << f->offset;
18              next1 |= next2;
19              f++;
```

-continued

```
20        }
21            *position++ = next1;
22            q++;
23        }
24 }
```

The routine "insert3" receives three arguments: (1) "position," a pointer to the position within executable code to insert instructions of an instruction block; (2) "p" a pointer to an instruction-block-describing data structure equivalent to the data structure shown in FIGS. 18 and 19, that describes the instruction block to insert; and (3) "fieldValues," a pointer to an array of integer values representing the values of fields within the instructions of the instruction block, in the order that they appear in the sequence of instructions representing the instruction block. In the for-loop of lines 9-23, the routine "insert3" iteratively processes each instruction description within the data structure describing the instruction block. The instruction is constructed by first copying the overall bit pattern for the instruction into the local variable "next1," on line 12. Then, in the inner for-loop of lines 13-20, the values for each of the fields of the instruction are obtained from the array of field values provided as an argument and copied into the instruction by a logical or operation, on line 18.

Although the routine "insert3" is, by inspection, somewhat more complex than the previously described routines "insert2" and "insert1," the routine "insert3" handles instruction insertion into executable code that is subject to recompilation and/or re-linking, and does so without requiring extensive tables of alternative forms of instructions, as needed by the approach embodied in the routine "insert2." The instruction-block-representing data structure is generated to specify the non-constant fields of the instructions of an instruction block, the values for which can be straightforwardly supplied as an integer array.

Although the present invention has been described in terms of a particular embodiment, it is not intended that the invention be limited to this embodiment. Modifications within the spirit of the invention will be apparent to those skilled in the art. For example, an almost limitless number of implementations can be crafted to generate instruction blocks by the methods of the present invention. Instruction-block-representing data structures of many different forms can be used to contain the instruction-block information needed for generating instruction blocks, by the methods of the present invention. As discussed above, the methods of the present invention find particular utility in virtual-machine monitors that dynamically patch guest-operating-system code, but may find utility in many other types of code-modifying programs and routines.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for inserting one or more instructions into memory-resident machine code stored in the memory of a computer, the method comprising:
preparing, by a program-controlled processor of the computer, a block description of the one or more instructions, the description including, for each instruction of the one or more instructions, an instruction description including a constant-portion value and descriptions of each variable portion, wherein the descriptions for each variable portion further includes a supplied variable-portion value and a shift value for shifting the supplied variable-portion value;
for each instruction description in the block description, building, by the program-controlled processor of the computer, a memory-resident instruction from the constant-portion value and descriptions of each variable portion; and inserting the memory-resident instruction into the memory-resident machine code.

2. The method of claim 1 wherein building the memory-resident instruction from the constant-portion value and descriptions of each variable portion further includes:
assigning to the memory-resident instruction the constant-portion value in the instruction description;
for each variable-portion description in the instruction description,
shifting the supplied variable-portion value by the shift value stored in the variable-portion description and logically ORing the shifted supplied variable-portion value with the memory-resident instruction.

3. The method of claim 1 where the block description describes a single instruction.

4. The method of claim 1 where the block description describes multiple instructions.

5. The method of claim 1 wherein the values supplied for each variable portion of an instruction are supplied in an integer array.

6. Computer-readable instructions encoded in a computer-storage medium that implement the method of claim 1.

7. A virtual-machine monitor, implemented by computer-instruction control of one or more hardware processors within a computer system, that includes instructions that implement the method of claim 1.

* * * * *